United States Patent
Hahn et al.

(10) Patent No.: US 11,386,203 B2
(45) Date of Patent: Jul. 12, 2022

(54) DETECTION OF COMPROMISED STORAGE DEVICE FIRMWARE

(71) Applicant: Western Digital Technologies, Inc., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 194 days.

(21) Appl. No.: 16/901,633

(22) Filed: Jun. 15, 2020

(65) Prior Publication Data

US 2021/0390179 A1 Dec. 16, 2021

(51) Int. Cl.
| | |
|---|---|
| *G06F 21/55* | (2013.01) |
| *G06F 11/10* | (2006.01) |
| *G06F 12/10* | (2016.01) |
| *G06F 13/16* | (2006.01) |
| *G06F 13/28* | (2006.01) |
| *G06F 21/60* | (2013.01) |
| *G06F 21/70* | (2013.01) |
| *G06F 21/71* | (2013.01) |
| *G06F 12/02* | (2006.01) |
| *G06F 9/4401* | (2018.01) |

(Continued)

(52) U.S. Cl.
CPC ........ *G06F 21/552* (2013.01); *G06F 11/1068* (2013.01); *G06F 12/10* (2013.01); *G06F 13/1673* (2013.01); *G06F 13/28* (2013.01); *G06F 21/606* (2013.01); *G06F 21/71* (2013.01); *G06F 2221/033* (2013.01)

(58) Field of Classification Search
CPC .... G06F 21/552; G06F 11/1068; G06F 12/10; G06F 13/1673; G06F 13/28; G06F 21/606; G06F 21/71; G06F 2221/033; G06F 11/1048; G06F 2212/1024; G06F 2212/1052; G06F 12/0246; G06F 2212/7201; G06F 2212/7208; G06F 21/602; G06F 21/554; G06F 9/4401; G06F 11/3034; G06F 11/3612; G06F 13/385; G06F 21/566; G06F 21/79; G06N 3/08; G06N 20/10
See application file for complete search history.

(56) References Cited

U.S. PATENT DOCUMENTS 7,590,880 B1 * 9/2009 Hershman ............. G06F 21/755
   713/400
8,896,455 B2 * 11/2014 Eguro ..................... G06F 21/86
   340/657

(Continued)

*Primary Examiner* — Darren B Schwartz
(74) *Attorney, Agent, or Firm* — Patterson + Sheridan, LLP; Steven H. Versteeg

(57) ABSTRACT

An apparatus, system, and method for detecting compromised firmware in a non-volatile storage device. A control bus of a non-volatile storage device is monitored. The non-volatile storage device includes a processor and electronic components coupled to the control bus. Signal traffic on the control bus is analyzed for events and/or triggers related to storage operations initiated on the control bus by the processor. Storage operations include one or more commands directed to at least one of the electronic components. If the latency for the storage operation satisfies an alert threshold a host is notified of compromised firmware.

15 Claims, 9 Drawing Sheets

(51) Int. Cl.
*G06F 11/36* (2006.01)
*G06F 13/38* (2006.01)
*G06F 21/56* (2013.01)
*G06F 21/79* (2013.01)
*G06N 3/08* (2006.01)
*G06N 20/10* (2019.01)

(56) References Cited

U.S. PATENT DOCUMENTS

| | | | |
|---|---|---|---|
| 10,193,903 B1* | 1/2019 | Bajpai | H04L 63/1425 |
| 10,311,229 B1* | 6/2019 | Pohlack | G06F 8/41 |
| 10,817,606 B1* | 10/2020 | Vincent | G06F 9/45558 |
| 2005/0075842 A1* | 4/2005 | Ormazabal | H04L 63/1433 |
| | | | 702/188 |
| 2008/0282342 A1* | 11/2008 | Hatakeyama | H04L 9/3226 |
| | | | 712/30 |
| 2016/0063252 A1* | 3/2016 | Spernow | G06F 21/562 |
| | | | 726/23 |
| 2016/0092681 A1* | 3/2016 | Valles | G06F 21/554 |
| | | | 726/23 |
| 2017/0212844 A1* | 7/2017 | Williams | G06F 11/3419 |
| 2018/0239906 A1* | 8/2018 | Aguayo Gonzalez | G06F 21/755 |
| 2018/0295144 A1* | 10/2018 | Jackson | H04L 43/10 |
| 2019/0384501 A1* | 12/2019 | Jagtap | G06F 3/068 |
| 2020/0226251 A1* | 7/2020 | Ferragut | G06F 21/552 |
| 2020/0233611 A1* | 7/2020 | Chen | G06F 3/0679 |
| 2021/0026540 A1* | 1/2021 | Lai | G06F 3/0622 |

* cited by examiner

DETECTION OF COMPROMISED STORAGE DEVICE FIRMWARE

BACKGROUND

Non-volatile storage devices, including memory devices store a variety of data of varying levels of sensitivity. Such data may be targeted by persons or entities seeking to obtain, review, copy, alter, manipulate, or destroy the data. This means that security of the non-volatile storage device and its electronic components and circuitry and all firmware executing within the non-volatile storage device can be a top priority. Firmware of a non-volatile storage device can become compromised by malware or software viruses.

The means and mechanisms used by those seeking to access and manipulate or control sensitive data of a non-volatile storage device continue to advance. Conventional malware or software viruses may use very sophisticated techniques to compromise firmware and then avoid detection. It would be valuable to provide one or more mechanisms within a non-volatile storage device that are not subject to compromise and that can reliably identify when and if one or more firmware images of a non-volatile storage device may have been compromised.

Therefore, there is a need for solutions that reliably detect potential security threats and can take steps to alert an owner of the non-volatile storage device.

BRIEF SUMMARY

This disclosure relates to a method for detecting a compromised firmware image, including a storage controller firmware image. First a control bus of a non-volatile storage device is monitored. The non-volatile storage device comprises a processor and a plurality of electronic components coupled to the control bus. Signal traffic on the control bus is then analyzed for events related to storage operations initiated on the control bus by the processor. Storage operations comprise one or more commands directed to at least one of the plurality of electronic components. Latency for the storage operations is measured. If the latency for the storage operation is determined to satisfy an alert threshold a host is notified of compromised firmware.

This disclosure further relates to an apparatus for detecting a compromised storage controller firmware image. The apparatus comprises a communication bus, a memory, a processor, and a communication module. The memory is coupled to the communication bus and is configured to store a storage security firmware image, an alert threshold, and a repository of latency data. The processor is coupled to the communication bus and is configured to execute the storage security firmware image. The storage security firmware image comprises a monitor, a detector, and a reporter. The monitor is configured to generate latency data for a target storage operation. The target storage operation is identified based on signal traffic on the communication bus. The detector is configured to determine an anomaly based on the latency data for the target storage operation. The reporter is configured to signal a host in response to the detector identifying the anomaly indicating a compromised storage controller firmware image. The communication module is coupled to the communication bus and is configured to communicate the anomaly to the host.

Finally, this disclosure relates to a system for detecting a compromised storage controller firmware image. The system comprises a non-volatile memory array, a storage controller, a host interface manager, and a memory interface manager. The non-volatile memory array is configured to store data in memory cells. The storage controller comprises an internal communication bus, a storage processor, volatile memory, an error correcting code (ECC) manger, a direct memory access (DMA) manager, a FLASH translation manager, a host memory buffer manager, and a security chip. The storage processor is coupled to the internal communication bus.

The volatile memory is coupled to the internal communication bus and configured to store a storage controller firmware image. The ECC manager is coupled to the internal communication bus and configured to encode and decode data stored on, and retrieved from, the non-volatile memory array. The DMA manager is coupled to the internal communication bus and configured to transfer data between a host and the storage controller. The FLASH translation manager is coupled to the internal communication bus and configured to translate a logical block address into a physical block address within the non-volatile memory array and manage caching of an address mapping table.

The host memory buffer manager is coupled to the internal communication bus and configured to manage a host memory buffer within volatile memory of the host. The security chip is coupled to the internal communication bus and configured to monitor signal traffic on the internal communication bus to detect anomalies indicative of a compromised storage controller firmware image. The host interface manager is coupled to an external communication bus and configured to communicate between the host and the storage controller and to maintain a secure communication channel between the host and the security chip. The memory interface manager is coupled to the internal communication bus and to an external communication bus coupled to the non-volatile memory array for reading and writing data to the non-volatile memory array.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein is a non-volatile storage device, memory device, and/or memory device controller that may track latency of different internal firmware operations, including storage operations, and detect suspicious events indicated in this data as potential threats.

The disclosed solutions counteract security threats. Certain embodiments may alert a host when such threats are detected. The host may perform further analyses, initiate additional testing, or implement host-level counter measures.

One indication of proper behavior of a memory firmware operation, including a storage operation, is a latency measure for the operation. "Latency" refers to a period of time, often characterized as a delay, between when an operation starts and when the operation stops, completes, or encounters an error condition. Latency may be measured in units of time such as nanoseconds, microseconds, milliseconds, seconds, minutes, hours, days, weeks, or the like.

Monotonically tracking latency statistics of memory firmware may be valuable. However, the host processor may be unable track these internal measures. Alternatively, or in addition, firmware that is compromised firmware may report false latency measures in order to avoid detection. In certain implementations, the measurements and anomaly detection alert capabilities may be assigned to the memory firmware itself, as the firmware may have the access to the latency information of various internal operations. "Anomaly" refers to something different, abnormal, peculiar, or not easily classified. something anomalous. A deviation from the common rule or behavior. ("anomaly." Merriam-Webster-.com. Merriam-Webster, 2020. Web. Modified. Accessed 14 May 2020.)

The disclosed solutions may monitor, watch, or track a variety of events and operations, including storage operations. Among the relevant operations for which latency may be tracked by the disclosed solutions are the following:

Power down flows
Logical to physical translation
Reset flows
Exception flows
Computation algorithm if implemented in the device
Machine Learning (ML) training
Security operations (e.g., key manipulation)
Host memory buffer (HMB) initialization Anomaly detection based on these attributes may be calibrated either in the lab, and/or modified in field according to specific device workloads and physical properties. Another option is that the collected latency data may be reported back to the storage company server for further analysis and comparison of large amounts of data collected from various memory devices in field.

Figure 1:
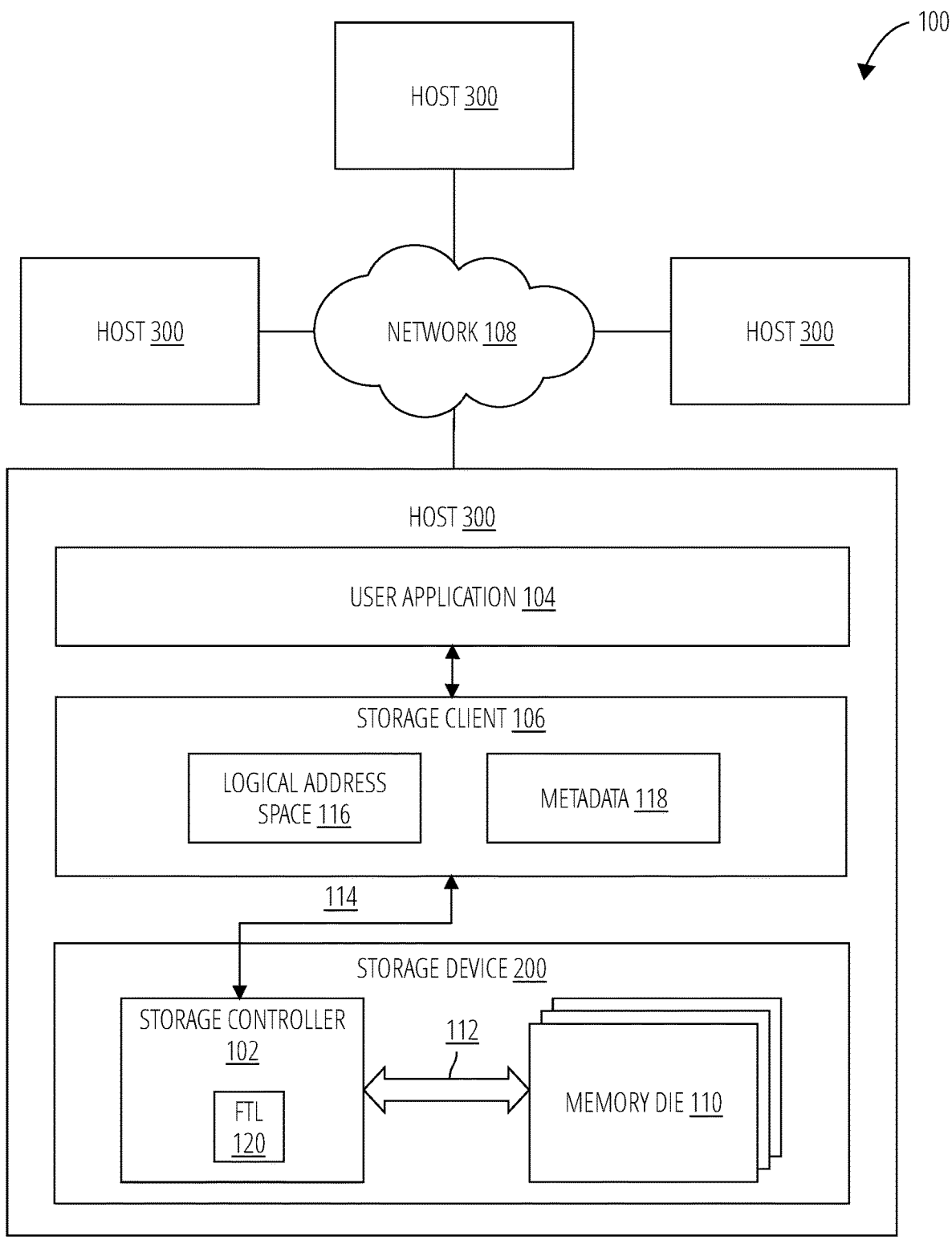
FIG. 1 illustrates a storage system 100 in accordance with one embodiment.

FIG. 1 is a schematic block diagram illustrating one embodiment of a storage system 100 that includes a storage device in accordance with the disclosed solution. "Storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

"Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like.

The storage system 100 may comprise a plurality of hosts 300 connected by a network 108. One host 300 may include a user application 104, storage client 106, and storage device 200. The storage device 200 may include a storage controller 102, and one or more memory die 110 coupled by way of a bus 112 (the bus 112 may include a data bus). The storage controller 102 may include a FLASH translation layer 120. Bus 114 (which may include a data bus) may couple the storage device 200 to the storage client 106.

Bus 112 and/or bus 114 may comprise a communication bus. "Communication bus" refers to hardware, software, firmware, logic, control line(s), and one or more associated communication protocols, that are configured to enable a sender to send data to a receiver. A communication bus may include a data bus and/or a control bus.

"Control bus" refers to a communication bus used to exchange one or more of data, address information, control signals, clock signals, and the like, between two electronic circuits, components, chips, die, and/or systems. A control bus may comprise 1 or more control lines, be configured to operate as a parallel bus or a serial bus, and may include the hardware, control line(s), software, firmware, logic, and/or the communication protocol used to operate the control bus. Typically, a control bus sends control signals to one or more memory die to manage operations on the memory die.

In certain embodiments, the control bus sends control signals such as write enable ("WE" or WE #), chip enable ("CE" or "CE #), read enable ("RE" or Re), a clock signal, strobe signal ("DQS"), command latch enable ("CLE"), address latch enable ("ALE"), storage operation commands in the form of operation codes ("OP" codes) and addressing information for a communicated storage operation.

In certain embodiments, the control bus may not transfer data relating to a storage operation, such as write data or read data. Instead, write data and read data may be transferred over a data bus. In certain embodiments, a control bus and a data bus together may form a communication bus between a sender and a receiver. "Signal" refers to an electrical signal (wired or wireless) sent from one component, circuit, driver, device, manager, or controller to another component, circuit, driver, device, manager, or controller.

"Data bus" refers to a communication bus used to exchange one or more of data bits between two electronic circuits, components, chips, die, and/or systems. A data bus may include one or more signal/control lines. A sender, such as a controller, may send data signals over one or more control lines of the data bus in parallel (operating as a parallel bus) or in series (operating as a serial bus). A data bus may include the hardware, control line(s), software, firmware, logic, and/or the communication protocol used to operate the data bus.

Examples data buses may include 8-bit buses having 8 control lines, 16-bit buses having 16 control lines, 32-bit buses having 32 control lines, 64-bit buses having 64 control lines, and the like. Control lines may carry exclusively communication data, exclusively address data, exclusively control data, or any combination of these types of data.

In one embodiment, a single data bus may be shared by a plurality of components, such as memory die. When multiple chips or memory die share a data bus, that data may be accessed or transferred by a single memory die or by all the memory die in parallel based on signals on a chip enable control line.

A data bus may operate, and be configured, according to an industry standard or based on a proprietary protocol and design. Multiple control line of a data bus may be used in parallel and may latch data into latches of a destination component according to a clocking signal, data strobe signal ("DQS"), or clock, such as strobe signal. In certain embodiments, a control bus and a data bus together may form a communication bus between a sender and a receiver. "Firmware" refers to logic embodied as processor-executable instructions stored on volatile memory media and/or non-volatile memory media.

"Host" refers to any circuit, chip, processor, computing device, computer device, computer module, computer subsystem, or computer system configured to send and receive storage commands. Examples of a host include, but are not limited to, a computer, a laptop, a mobile device, an appliance, a virtual machine, an enterprise server, a desktop, a tablet, a main frame, and the like.

The host 300 and/or storage controller 102 may each include one or more processors. "Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random-access memory), or circuitry forming a communications device (e.g., a modem, communications switch, or optical-electrical equipment).

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Command" refers to an instruction sent from one device, component, module, manager, or controller to another device, component, module, manager, or controller configured to cause a predetermined action or operation. "Storage command" refers to any command relating to a storage operation. Examples of storage commands include, but are not limited to, read commands, write commands, maintenance commands, configuration command, administration command, diagnostic commands, test mode commands, countermeasure command, and any other command a storage controller may receive from a host or issue to another component, device, or system. In general, a storage command is a command issued to a storage or memory device from a host or master or another component or device. A storage command typically initiates one or more storage operations.

The storage system 100 includes at least one storage device 200, comprising a storage controller 102 and one or more memory die 110, connected by a bus 112. In some embodiments, each storage device 200 may include two or more memory die 110, such as flash memory, nano random-access memory ("nano RAM or NRAM"), magneto-resistive RAM ("MRAM"), dynamic RAM ("DRAM"), phase change RAM ("PRAM"), etc. In further embodiments, the data storage device 200 may include other types of non-volatile and/or volatile data storage, such as dynamic RAM ("DRAM"), static RAM ("SRAM"), magnetic data storage, optical data storage, and/or other data storage technologies. "Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Memory die" refers to a small block of semiconducting material on which a given functional circuit is fabricated. Typically, integrated circuits are produced in large batches on a single wafer of electronic-grade silicon (EGS) or other semiconductor (such as GaAs) through processes such as photolithography. The wafer is cut (diced) into many pieces, each containing one copy of the circuit. Each of these pieces is called a die. (Search die (integrated circuit) on Wikipedia.com Oct. 9, 2019. Accessed Nov. 18, 2019.) A memory die is a die, in one embodiment, that includes a functional circuit for operating as a non-volatile memory media and/or a non-volatile memory array.

The storage device 200 may be a component within a host 300 as depicted in here, and may be connected using a bus 114, such as a peripheral component interconnect express ("PCI-e") bus, a Serial Advanced Technology Attachment ("serial ATA") bus, or the like. In another embodiment, the storage device 200 is external to the host 300 and is connected, a universal serial bus ("USB") connection, an Institute of Electrical and Electronics Engineers ("IEEE") 1394 bus ("FireWire"), or the like. In other embodiments, the storage device 200 is connected to the host 300 using a peripheral component interconnect ("PCI") express bus using external electrical or optical bus extension or bus networking solution such as InfiniBand or PCI Express Advanced Switching ("PCIe-AS"), or the like.

In various embodiments, the storage device 200 may be in the form of a dual-inline memory module ("DIMM"), a daughter card, or a micro-module. In another embodiment, the storage device 200 is a component within a rack-mounted blade. In another embodiment, the storage device 200 is contained within a package that is integrated directly onto a higher-level assembly (e.g., mother board, laptop, graphics processor). In another embodiment, individual components comprising the storage device 200 are integrated directly onto a higher-level assembly without intermediate packaging. The storage device 200 is described in further detail with regard to FIG. 2.

In a further embodiment, instead of being connected directly to the host 300 as DAS, the data storage device 200 may be connected to the host 300 over a data network. For example, the data storage device 200 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 300 and the data storage device 200.

The storage controller 102 manages the memory die 110. "Storage controller" refers to any hardware, device, component, element, or circuit configured to manage data operations and/or storage operations on non-volatile memory media, and may comprise one or more processors, programmable processors (e.g., FPGAs), ASICs, micro-controllers, or the like.) A storage controller may take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, or the like.

In some embodiments, the storage controller is configured to store data on and/or read data from non-volatile memory media, to transfer data to/from the non-volatile memory device(s), and so on. A storage controller can have various functionality in addition to the specific functionality described herein.

For example, the storage controller can format the non-volatile memory media to ensure the memory is operating properly, map out bad memory cells, and allocate spare cells to be substituted for future failed cells. Some part of memory cells may be used to hold firmware to operate the storage controller and implement other features.

One example of the firmware, or modules within firmware, is a flash translation manager. In operation, when a host device needs to read data from, or write data to, the non-volatile memory media, the host device may provide a logical block address to which data is to be read/written, the storage controller, uses the flash translation manager to convert the logical block address to a physical block address in the non-volatile memory media.

The storage controller can also perform various memory management functions, such as, but not limited to, wear leveling (distributing writes to avoid wearing out specific storage blocks of memory that would otherwise be repeatedly written to) and garbage collection (after a storage block is full, moving only the valid pages of data to another storage block, so the full storage block can be erased and reused).

"Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

"Storage operation" refers to an operation performed on, within, to, or in relation to, a non-volatile storage device and/or non-volatile storage media. Examples of storage operations include, but are not limited to, a power on reset operation, a firmware initialization operation, a data refresh operation, a data scrub operation, a garbage collection operation, an erase operation, a maintenance operation, a test mode operation, a program storage operation, a read scan operation, a host memory buffer access operation, a host memory buffer maintenance operation, a cache access operation, a cache maintenance operation, a memory address translation lookup operation, a memory address translation cache swapping/paging operation, and the like. Further examples of storage operations include but are not limited to, reading data from (or sensing a state of) a memory cell, writing (or programming) data to a memory cell, and/or erasing data stored in a memory cell.

The storage system 100 includes at least one host 300 connected to the storage device 200. Multiple hosts 300 may be used and may comprise a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host 300 may be a client, and the storage device 200 may operate autonomously to service data requests sent from the host 300. In this embodiment, the host 300 and storage device 200 may be connected using a computer network, system bus, Direct Attached Storage (DAS), or other communication means suitable for connection between a computer and an autonomous storage device 200.

The depicted embodiment shows a user application 104 in communication with a storage client 106 as part of the host 300. In one embodiment, the user application 104 is a software application operating on or in conjunction with the storage client 106.

"Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like.

The storage client 106 manages files and data and utilizes the functions and features of the storage controller 102 and associated memory die 110. Representative examples of storage clients include, but are not limited to, a server, a file system, an operating system, a database management system ("DBMS"), a volume manager, and the like. The storage client 106 is in communication with the storage controller 102 within the storage device 200. In some embodiments, the storage client 106 may include remote storage clients operating on hosts 300 or otherwise accessible via the network 108. Storage clients may include, but are not limited to operating systems, file systems, database applications, server applications, kernel-level processes, user-level processes, applications, and the like.

The storage client 106 may present a logical address space 116 to the host 300 and/or user application 104. The logical address space 1166 may comprise a plurality (e.g., range) of logical addresses. "Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

"Logical block address" refers to a value used in a block storage device to associate each of n logical blocks available for user data storage across the storage media with a logical address. In certain block storage devices, the logical block addresses (LBAs) may range from 0 to n per volume or partition. In block storage devices, each LBA maps directly to a particular data block, and each data block maps to a particular set of physical sectors, or physical data block addresses (physical block address) on the physical storage media. "LBA" refers to and abbreviation for a logical block address. "Physical block address" refers to address information that uniquely identifies a physical location of a data block relative to all other data blocks of a non-volatile memory array.

In one embodiment, a device driver for the host 300 (and/or the storage client 106) may maintain metadata 118 within the storage client 106, such as a logical to physical address mapping structure, to map logical addresses of the logical address space 116 to storage locations on the memory die 110. In another embodiment, such metadata 118 may be stored and maintained by a storage controller 102. A device driver may be configured to provide storage services to one or more storage clients 106.

The storage controller 102 may comprise the FLASH translation layer 120. "FLASH translation layer" refers to logic in a non-volatile storage device, chip, or component, such as a FLASH memory device, that includes logical-to-physical address translation providing abstraction of the logical block addresses used by a storage client (e.g. a host) and the physical block addresses at which a storage controller stores data. The logical-to-physical translation layer maps logical block addresses (LBAs) to physical addresses of data stored on solid-state storage media. This mapping allows data to be referenced in a logical block address space using logical identifiers, such as a block address. A logical identifier does not indicate the physical location of data on the solid-state storage media but is an abstract reference to the data.

The FLASH translation layer 120 receives the processed data as well as one or more control signals to determine the FLASH translation layer 120 queue depth. The FLASH translation layer 120 may determine an appropriate physical address to send data and commands to the memory die 110 and the volatile memory. In certain embodiments, a storage client 106 may include the FLASH translation layer 120 and may manage metadata 118 associated with the FLASH translation layer 120. In one embodiment, the FLASH translation layer 120 also receives the data outputs from the memory die 110.

In one embodiment, the storage system 100 includes one or more clients connected to one or more hosts 300 through one or more computer networks 108. A host 300 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 108 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 108 may also include a network from the IEEE 802 family of network technologies, such Ethernet, token ring, WiFi, WiMax, and the like.

The network 108 may include servers, switches, routers, cabling, radios, and other equipment used to facilitate networking the host 300 or hosts 300 and clients. In one embodiment, the storage system 100 includes multiple hosts 300 that communicate as peers over a network 108. In another embodiment, the storage system 100 includes multiple storage devices 200 that communicate as peers over a network 108. One of skill in the art will recognize other computer networks comprising one or more computer networks and related equipment with single or redundant connection between one or more clients or other computer with one or more storage devices 200 connected to one or more hosts. In one embodiment, the storage system 100 includes two or more storage devices 200 connected through the network 108 to a remote host 300, without being directly connected to or integrated within a local host 300.

In one embodiment, the storage client 106 communicates with the storage controller 102 through a host interface comprising an Input/Output (I/O) interface. For example, the storage device 200 may support the Non-volatile memory Express (NVMe) interface standard, also referred to as the Non-volatile memory Host Controller Interface Specification (NVMHCIS).

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably). "Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like.

Certain conventional storage devices divide the physical storage media into volumes or logical partitions (also referred to as partitions). Each volume or logical partition may include a plurality of sectors. One or more sectors are organized into a block (also referred to as a data block).

In certain storage systems, such as those interfacing with the Windows® operating systems, the data blocks are referred to as clusters. In other storage systems, such as those interfacing with UNIX, Linux, or similar operating systems, the data blocks are referred to simply as blocks.

A data block or cluster represents a smallest physical amount of storage space on the storage media that is managed by a storage controller. A block storage device may associate n data blocks available for user data storage across the physical storage media with a logical block address (LBA), numbered from 0 to n.

In certain block storage devices, the logical block addresses may range from 0 to n per volume or logical partition. In conventional block storage devices, a logical block address maps directly to one and only one data block.

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die 110. The memory die 110 may be partitioned into memory divisions that can be erased as a group (e.g., erase blocks) in order to, inter alia, account for the asymmetric properties of the memory die 110 or the like. As such, modifying a single data block in-place may involve erasing the entire physical erase block comprising the data, and rewriting the modified data to the physical erase block, along with the original, unchanged data. "Physical erase block" refers to a smallest storage unit within a given memory die that can be erased at a given time (e.g., due to the wiring of storage cells on the memory die). This may result in inefficient write amplification, which may excessively wear the memory die 110.

"Storage block" refers to a set of storage cells organized such that storage operations can be performed on groups of the storage cells in parallel. The organization of the set of storage cells may be implemented at a physical level or a logical level. Thus, a storage block, in one embodiment, may comprise a physical page, such as a word line, a logical page comprising physical pages that span planes and/or memory die, a physical erase block comprising a set of physical pages, a logical erase block (LEB) comprising a set of logical pages, or the like. A storage block may be referred to herein as a "block", a "memory block", a "metablock," or an LEB.

Therefore, in some embodiments, the storage controller 102 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the path of a write operation). Management of a data block by a storage manager includes specifically addressing a particular data block for a read operation, write operation, or maintenance operation.

A block storage device may associate n blocks available for user data storage across the storage media with a logical address, numbered from 0 to n. In certain block storage devices, the logical addresses may range from 0 to n per volume or partition. These storage devices may emulate a conventional block storage interface to maintain compatibility with a block storage client 106.

In one embodiment, the storage controller 102 provides a block I/O emulation layer, which serves as a block device interface, or API. In this embodiment, the storage client 106 communicates with the storage device through this block device interface. In one embodiment, the block I/O emulation layer receives commands and logical addresses from the storage client 106 in accordance with this block device interface. As a result, the block I/O emulation layer provides the storage device compatibility with a block storage client 106.

In one embodiment, a storage client 106 communicates with the storage controller 102 through a host interface comprising a direct interface. In this embodiment, the storage device directly exchanges information specific to non-volatile storage devices.

A storage device using direct interface may store data in the memory die 110 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 110.

The storage controller 102 receives a logical address and a command from the storage client 106 and performs the corresponding operation in relation to the memory die 110. The storage controller 102 may support block I/O emulation, a direct interface, or both.

Figure 2:
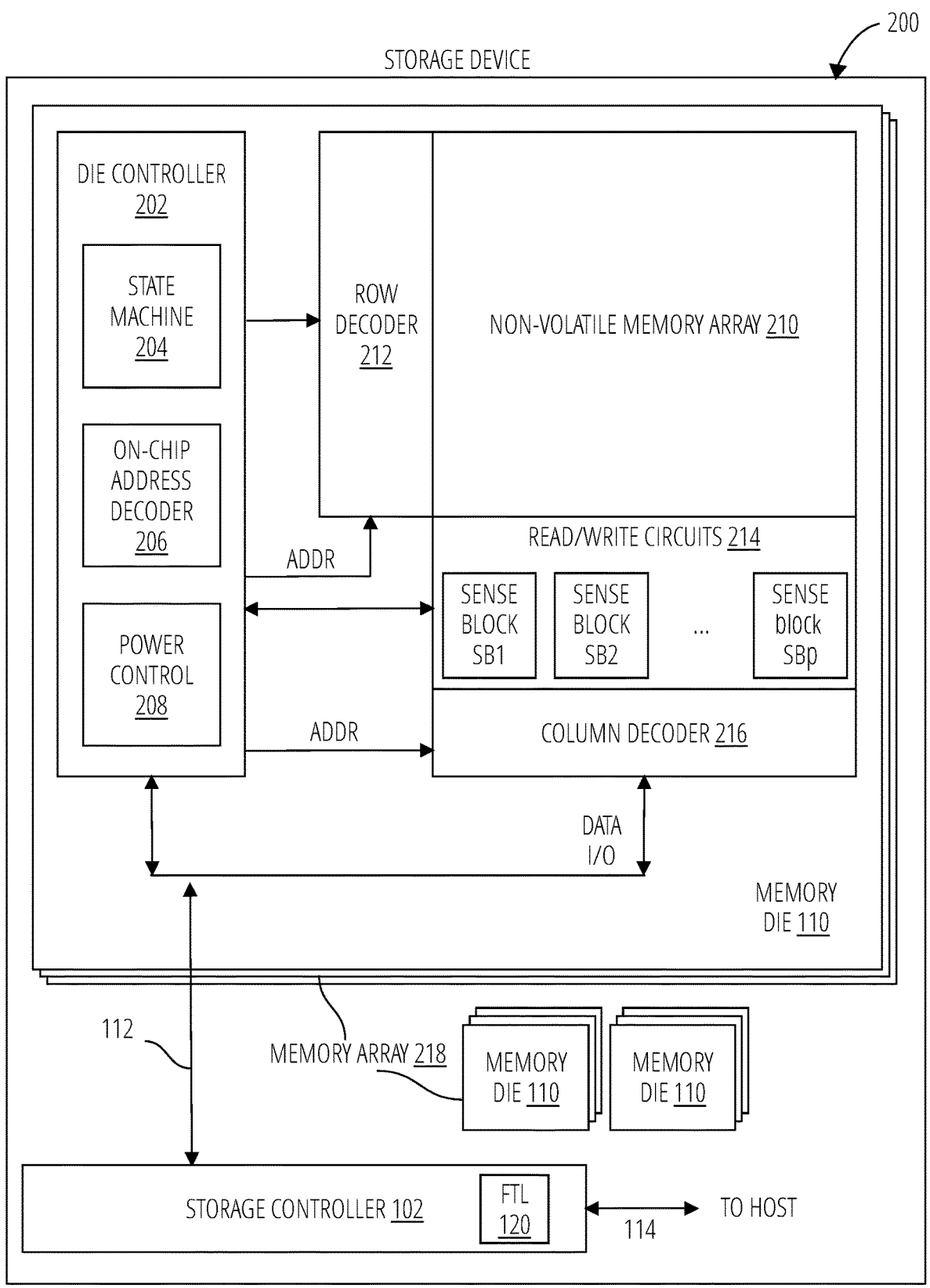
FIG. 2 illustrates a storage device 200 in accordance with one embodiment.

FIG. 2 is a block diagram of an exemplary storage device 200. The storage device 200 may include a storage controller 102 with a FLASH translation layer 120, and a memory array 218. Each memory die 110 in the memory array 218 may include a die controller 202, at least one non-volatile memory array 210 in the form of a three-dimensional array, and read/write circuits 214.

"Memory array" refers to a set of storage cells (also referred to as memory cells) organized into an array structure having rows and columns. A memory array is addressable using a row identifier and a column identifier. "Non-volatile memory array" refers to a set of non-volatile storage cells (also referred to as memory cells or non-volatile memory cells) organized into an array structure having rows and columns. A memory array is addressable using a row identifier and a column identifier.

Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array.

The non-volatile memory array 210 is addressable by word line via a row decoder 212 and by bit line via a column decoder 216. "Word line" refers to a structure within a memory array comprising a set of memory cells. The memory array is configured such that the operational memory cells of the word line are read or sensed during a read operation. Similarly, the memory array is configured such that the operational memory cells of the word line are read, or sensed, during a read operation. The read/write circuits 214 include multiple sense blocks SB1, SB2, . . . , SBp (sensing circuitry) and allow a page of memory cells to be read or programmed in parallel. In certain embodiments, each memory cell across a row of the memory array together form a physical page.

A physical page may include memory cells along a row of the memory array for a single plane or for a single memory die. In one embodiment, the memory die includes a memory array made up of two equal sized planes. In one embodiment, a physical page of one plane of a memory die includes four data blocks (e.g., 16 KB). In one embodiment, a physical page (also called a "die page") of a memory die includes two planes each having four data blocks (e.g., 32 KB).

Commands and data are transferred between the host 300 and storage controller 102 via a bus 114, and between the storage controller 102 and the one or more memory die 110 via bus 112. The storage controller 102 may comprise the logical modules described in more detail with respect to FIG. 1.

The non-volatile memory array 210 can be two-dimensional (2D—laid out in a single fabrication plane) or three-dimensional (3D—laid out in multiple fabrication planes). The non-volatile memory array 210 may comprise one or more arrays of memory cells including a 3D array. In one embodiment, the non-volatile memory array 210 may comprise a monolithic three-dimensional memory structure (3D array) in which multiple memory levels are formed above (and not in) a single substrate, such as a wafer, with no intervening substrates. The non-volatile memory array 210 may comprise any type of non-volatile memory that is monolithically formed in one or more physical levels of arrays of memory cells having an active area disposed above a silicon substrate. The non-volatile memory array 210 may be in a non-volatile solid-state drive having circuitry associated with the operation of the memory cells, whether the associated circuitry is above or within the substrate.

Word lines may comprise sections of the layers containing memory cells, disposed in layers above the substrate. Multiple word lines may be formed on single layer by means of trenches or other non-conductive isolating features.

The die controller 202 cooperates with the read/write circuits 214 to perform memory operations on memory cells of the non-volatile memory array 210, and includes a state machine 204, an address decoder 206, and a power control 208. The state machine 204 provides chip-level control of memory operations.

The address decoder 206 provides an address interface between that used by the host or a storage controller 102 to the hardware address used by the row decoder 212 and column decoder 216. The power control 208 controls the power and voltages supplied to the various control lines during memory operations.

The power control 208 and/or read/write circuits 214 can include drivers for word lines, source gate select (SGS) transistors, drain gate select (DGS) transistors, bit lines, substrates (in 2D memory structures), charge pumps, and source lines. In certain embodiments, the power control 208 may detect a sudden loss of power and take precautionary actions. The power control 208 may include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than non-volatile memory array 210, can be thought of as at least one control circuit or storage controller which is configured to perform the techniques described herein. For example, a control circuit may include any one of, or a combination of, die controller 202, state machine 204, address decoder 206, column decoder 216, power control 208, sense blocks SB1, SB2, . . . , SBp, read/write circuits 214, storage controller 102, and so forth.

In one embodiment, the host 300 is a computing device (e.g., laptop, desktop, smartphone, tablet, digital camera) that includes one or more processors, one or more processor readable storage devices (RAM, ROM, FLASH memory, hard disk drive, solid state memory) that store processor readable code (e.g., software) for programming the storage controller 102 to perform the methods described herein. The host may also include additional system memory, one or more input/output interfaces and/or one or more input/output devices in communication with the one or more processors, as well as other components well known in the art.

Associated circuitry is typically involved in operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Figure 3:
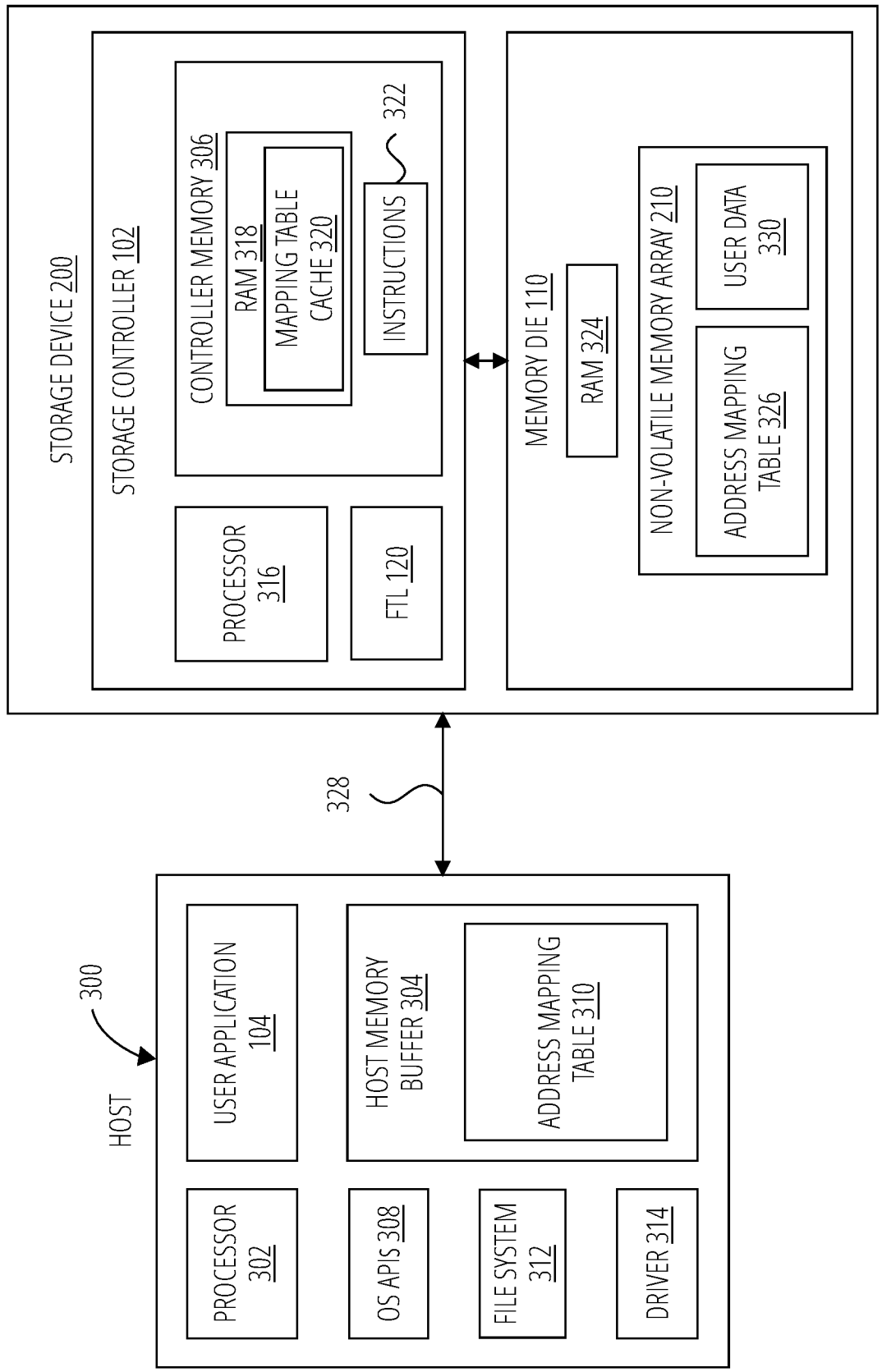
FIG. 3 is a block diagram of a host and a storage device according to one embodiment.

A non-volatile memory system suitable for use in implementing certain embodiments is shown in FIG. 3. A host 300 stores data into, and retrieves data from, a storage device 200. The storage device 200 may be embedded in the host 300 or may exist in the form of a card or other removable drive, such as a solid-state disk (SSD) that is removably connected to the host 300 through a mechanical and/or electrical connector. The host 300 may be any of a number of fixed or portable devices, such as a personal computer, a mobile telephone, a personal digital assistant (PDA), or the like. The host 300 communicates with the storage device 200 over a communication channel 328.

The storage device 200 contains a storage controller 102 and a memory die 110. As shown in FIG. 3, the storage controller 102 includes a processor 316 and a controller memory 306. The processor 316 may comprise a microprocessor, a microcontroller, an application specific integrated circuit (ASIC), a field programmable gate array, a logical digital circuit, or other now known or later developed logical processing capability. "Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

The processor 316 may comprise a storage processor. Storage device 200 may include one or more storage processors. "Storage processor" refers to a processor configured to manage and control storage operations on, among or between non-volatile storage devices and/or electronic components. In certain embodiments, a storage processor may be referred to as a central processing unit (CPU), an ASIC, a controller, a core, a physical core, or the like.

The controller memory 306 may include volatile memory such as random-access memory (RAM 318) and/or non-volatile memory, and processor executable instructions 322 for handling memory management. The RAM 318 may include one or more of any of a number of types of RAM, such as static RAM (SRAM) or dynamic RAM (DRAM). "Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media. "Non-volatile memory" refers to a type of storage or memory device, component, or apparatus that retains stored data when power is turned off or removed from the non-volatile memory.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as a memory media, in various embodiments, the volatile memory media may more generally be referred to as volatile memory.

In certain embodiments, data stored in volatile memory media is addressable at a byte level which means that the data in the volatile memory media is organized into bytes (8 bits) of data that each have a unique address, such as a logical address.

"Non-volatile memory media" refers to any hardware, device, component, element, or circuit configured to maintain an alterable physical characteristic used to represent a binary value of zero or one after a primary power source is removed.

As discussed in more detail below, the storage device 200 may include functions for memory management. In operation, the processor 316 may execute memory management instructions (which may be resident in instructions 322) for operation of memory management functions. The memory management functions may control the assignment of the one or more portions of the memory die 110 within the storage device 200.

The memory die 110 may include non-volatile memory media (such as FLASH memory). One or more memory types may be included in memory die 110. The memory may include non-volatile memory array 210. In embodiments where the memory die 110 includes FLASH memory as non-volatile memory, the non-volatile memory array 210 may be made up of the same type of FLASH memory cell or different types of FLASH memory cells. For example, the non-volatile memory array 210 may consist of both single-level cell (SLC) type FLASH and a multi-level cell (MLC) type FLASH memory having two or more bit per cell capacity to take advantage of the higher write speed of SLC flash and the higher density of MLC flash. Different combinations of FLASH memory types are also contemplated for the non-volatile memory array 210. Additionally, the memory die 110 may also include volatile memory such as any of a number of forms of random-access memory (RAM 324).

The non-volatile memory array 210 of memory die 110 may include physical blocks of FLASH memory that each consists of a group of pages, where a physical block of FLASH memory (also referred to as erase blocks) is a group of pages and a page is a smallest unit of writing in the memory. The physical blocks in the memory include operative blocks that are represented as logical blocks to a storage client such as the file system 312. The storage device 200 may be in the form of a portable flash drive, an integrated solid-state drive or any of a number of known flash drive formats. In yet other embodiments, the storage device 200 may include a single type of FLASH memory having one or more partitions.

Referring again to FIG. 3, the host 300 may include a processor 302 that runs one or more user applications 104. The user application 104, when data is to be stored on or retrieved from the storage device 200, communicate through one or more operating system application programming interfaces (APIs) 308 with the file system 312. The file system 312 may be a software module executed on the processor 302 and manages the files in the storage device 200. The file system 312 manages clusters of data in logical address space. The file system 312 may be circuitry, software, or a combination of circuitry and software. Accordingly, the file system 312 may be a stand-alone chip or software executable by the processor of the host 300. A storage device driver 314 on the host 300 translates instructions from the file system 312 for transmission over a communication channel 328 between the host 300 and storage device 200. The interface for communicating over the communication channel 328 may be any of a number of known interfaces, such as NVMe, Universal Flash Storage (UFS), or the like. The host 300 utilizes the file system data structure to maintain a logical address range for all logical block addresses (LBAs) that have been assigned by the host 300 to data.

In addition to the user data 330 and host-generated file system data structures that may be stored in FLASH memory on the storage device 200, the storage device itself stores and maintains an address mapping table 326, a logical-to-physical mapping table, or other data structure that tracks the logical addresses supplied by the host file system and the physical addresses where the storage device is keeping the data. A primary logical-to-physical mapping table, sometimes referred to as an address mapping table 326 may be stored in the non-volatile memory array 210. A copy of a portion of the address mapping table 326 may be cached in RAM 318 in the storage device 200 as a mapping table cache 320 for faster access to the logical-to-physical mapping information. "Mapping table cache" refers to a data structure configured to associate an LBA and/or an LBA range with a physical block address and/or a physical block address range. In one embodiment, the mapping table cache may store a portion of an address mapping table for faster access to relevant entries of the address mapping table.

The storage controller 102 may manage swapping of portions of the address mapping table between non-volatile memory array 210 and address mapping table 326 and the RAM 318 and mapping table cache 320. Within the storage device 200, the storage controller 102 may serve as a processor or manager. The controller memory 306 may store instructions 322 that, when executed by the storage controller 102, configure the apparatus to receive a first logical address associated with a first read command, wherein a first segment of a mapping table cache 320 comprises the first logical address. "Read command" refers to a type of storage command that reads data from memory cells. The storage device 200 may further receive a second logical address associated with a second read command, wherein a second segment of an address mapping table 326 comprises the second logical address.

The storage controller 102 may also manage storing a copy of, or a copy of portions of, the address mapping table 310 residing in host memory buffer 304 to the memory die 110 non-volatile memory array 210 (e.g., the flush operation or swapping operation). In one embodiment, the storage controller 102 may retrieve a stored copy of the address mapping table 326, or a portion thereof, from the non-volatile memory array 210 during an initialization operation, including a host memory buffer initialization operation. "Initialization operation" refers to any operation, process, method, procedure, and/or sequence of steps that are performed, either in series or in parallel, in order to prepare a device, module, circuit, component, sub-system, or system to begin performing normal operations.

Figure 4:
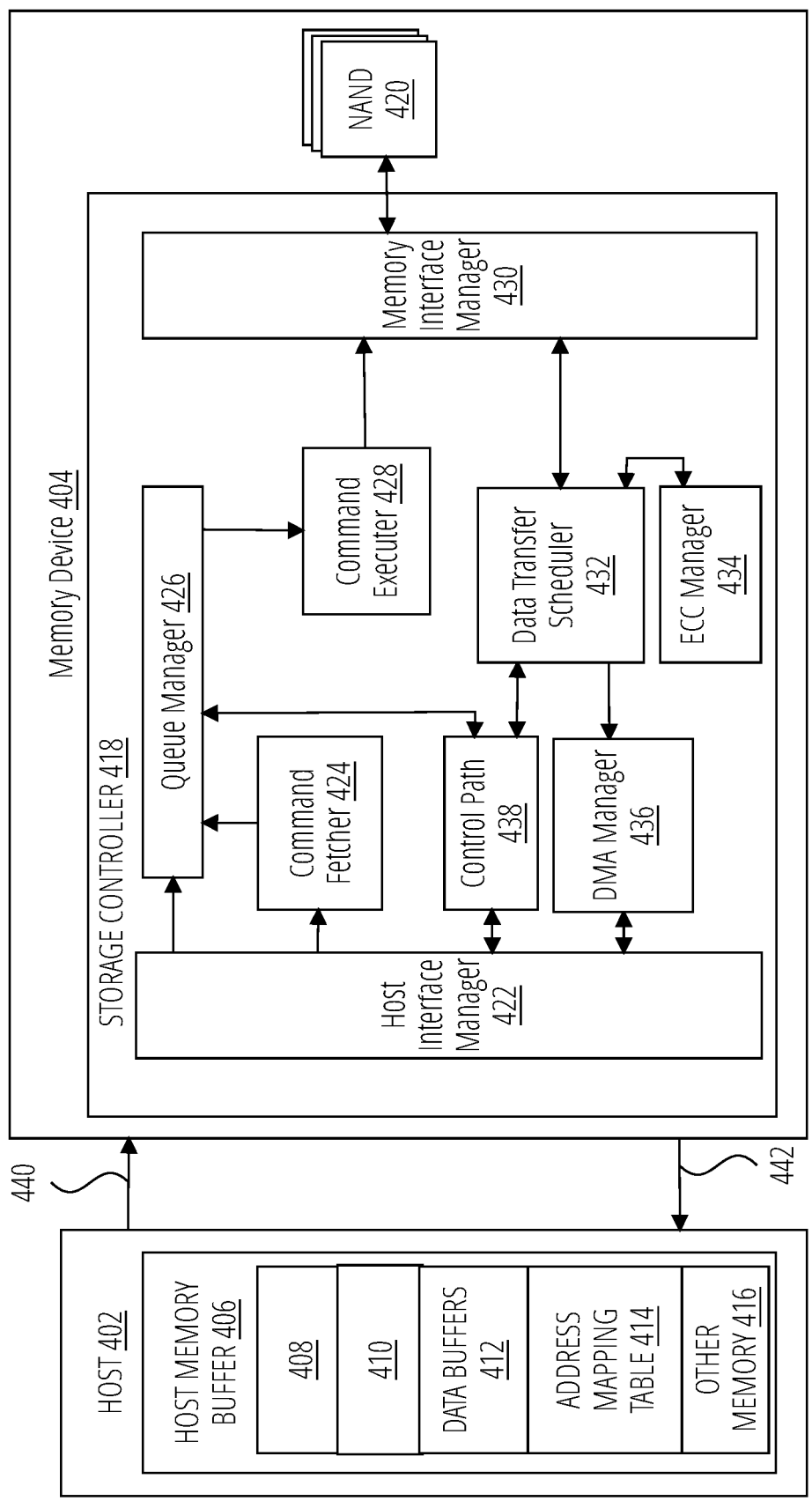
FIG. 4 is a block diagram of a host and a storage device according to one embodiment.

FIG. 4 is a block diagram of exemplary components of a host 402 and a memory device 404 (or storage device). The host 402 includes a host memory buffer 406, which may comprise one or more submission queues 408, one or more completion queues 410, data buffers 412, at least a portion of an address mapping table 414, and other memory 416. The memory device 404 includes a storage controller 418 and NAND 420 (e.g., memory die).

A host memory buffer 406 facilitates interaction, communication, and operations between the host 402 and the memory device 404. "Host memory buffer" ("HMB") refers to volatile memory in a host allocated for use instead of, or in addition to, volatile memory in a non-volatile storage device for storing portions of an address mapping table. For example, some non-volatile storage devices may not have volatile memory, or may have a very small amount of available volatile memory and the HMB may serve the same, or similar, function as volatile memory in a non-volatile storage device.

As another example, even if the non-volatile storage device includes volatile memory, a HMB may be used as a cache, a cache level, or a "spillover" memory for the address mapping table, so more entries of the address mapping table can be stored in volatile memory (i.e., in the volatile memory of the non-volatile storage device and the HMB of a host). This can improve performance, as storing more entries of the address mapping table can decrease the need to access the address mapping table in slower memory/storage such as non-volatile memory.

As data is written or moved in the memory dies of the memory device, the mapping in the logical-to-physical address map (address mapping table 414) (stored in the volatile memory of the memory device 404 and/or in the host memory buffer 406) may be updated (e.g., due to garbage collection, bad blocks replacement. etc.). The updated address mapping table 414 is eventually stored in the NAND 420, so the updates will be preserved after a power loss.

The storage controller 418, includes a host interface manager 422, a command fetcher 424, a queue manager 426, a command executer 428, a memory interface manager 430, a data transfer scheduler 432, an ECC manager 434, and a DMA manager 436.

The host interface manager 422 manages communication and interaction between the host 402 and the memory device 404. "Host interface manager" refers to hardware, firmware, software, circuitry, component, module, logic, device, or apparatus configured, programmed, designed, arranged, or engineered to support, interface with, and conduct communications between a host and a peripheral device such as a memory device, and/or non-volatile storage device.

In certain embodiments, a command fetcher 424, of the storage controller 418, may fetch and queue part, or all, of the storage commands from the submission queues 408 for further processing. If the storage command is fetched successfully with no errors, the command fetcher 424 may then send the queued commands to the queue manager 426. The queue manager 426 may manage host submission queues 408 and/or completion queues 410.

The DMA manager 436 is configured to perform the data transfer between host 402 and memory device 404. Queue manager 426 is configured to post completion entries to the completion queues 410, while also handling the relevant pointers. ECC manager 434 is configured to correct data that is fetched from the NAND memory arrays, NAND 420. Memory interface manager 430 is configured to control and access the NAND memory arrays, NAND 420.

FIG. 4 further illustrates a communication interface between the host 402 and memory device 404. In a first implementation (not illustrated in FIG. 4), the communication interface between the host device and the memory device is simplex, with communications to, and communications from, the memory device on the same path. In a second implementation (illustrated in FIG. 4), the communication interface between the host 402 and memory device 404 is duplex, with a separate ingress path 440 and a separate egress path 442. The ingress path 440, from the perspective of the memory device 404, includes incoming requests from the host 402 to the memory device 404. Conversely, the egress path 442, from the perspective of the memory device 404, includes outgoing requests from the memory device 404 to the host 402.

The incoming requests (requests from the host 402 to the memory device 404) may be segmented in different ways, such as incoming read requests and incoming write requests. For example, the host 402 may send, via the ingress path, a read request to read a section of memory in the memory device 404 or a write request to write to a section of memory in the memory device 404. Likewise, the memory device 404 may send, via the egress path, a read request to a section of memory in the host 402 or a write request to write to a section of memory in the host 402.

Each read request or write request may comprise one form of a storage operation. Each storage operation may include a number of sub-steps or operations to be performed in order to service the requested and/or complete the storage operation. For example, a read request may be received referencing an LBA that is not currently loaded in a portion of an address mapping table within a host memory buffer, or memory of storage controller 418, consequently, a new portion may be swapped into memory of storage controller 418 and/or the host memory buffer in order to convert the LBA to a physical block address to service the read request. These steps may have a deterministic duration, a predictable latency, and so such storage operations may be considered predictable storage operations.

The storage controller 418 may move data between the host memory buffer 406 and volatile memory and the NAND 420 memory to satisfy a write or read request. Additionally, in order to service a write command or read command, the storage controller 418 may swap one or more entries from the address mapping table 414. Such a swap operation may be tracked together with a host memory buffer 406 initialization operation. Storage controller 418 may include control path 438, which may handle various aspects of the submission queues 408, such as command fetching from the submission queues 408.

Command executer 428 is configured to select the next pending command for further execution from the queue manager 426. There may be several queues from which to select. Data transfer scheduler 432 is configured to schedule one or more types of data transfers. As one example, read data may arrive from different memory arrays in parallel. Data transfer scheduler 432 may arbitrate from amongst the different data transfers.

Storage operations may enter various phases, some of which may be performed by memory device 404. Blocks shown in FIG. 4 illustrate various modules and/or processors associated with the different phases of command processing. In certain embodiments, the blocks shown in FIG. 4 may be implemented using one or more processors in a variety of combinations, with additional circuitry, firmware image(s), and/or logic. The blocks shown in FIG. 4 may, collectively or individually, be considered an electronic component. "Electronic component" refers to any basic discrete device or physical entity in an electronic system used to affect electrons or their associated fields. ("electronic component" on Wikipedia. Apr. 18, 2020. Accessed May 15, 2020.)

Figure 5:
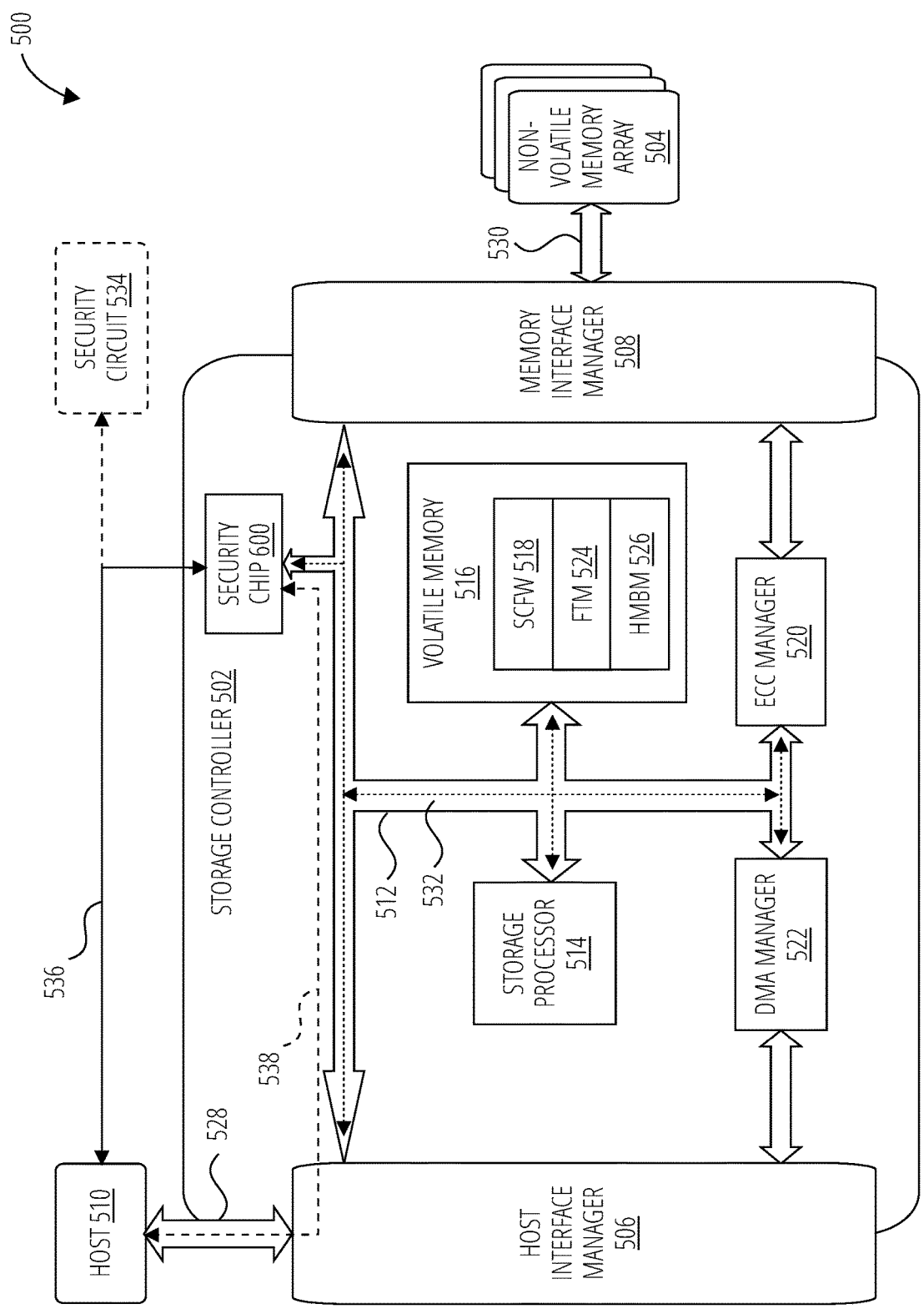
FIG. 5 illustrates a storage system 500 in accordance with one embodiment.

FIG. 5 illustrates a storage system 500 in accordance with one embodiment. The storage system 500 comprises a storage controller 502, a non-volatile memory array 504, a host interface manager 506, a memory interface manager 508, and a host 510.

The storage controller 502 may operate effectively as the storage controller 102 introduced in FIG. 1 and FIG. 2. The storage controller 502 may in some embodiments comprise at least one of the host interface manager 506 and the memory interface manager 508, though in other embodiments these functional components may be incorporated into the storage system 500 as separate elements. The storage controller 502 may comprise a security chip 600.

The non-volatile memory array 504 may be configured to store data in memory cells. The non-volatile memory array 504 may operate effectively as the non-volatile memory array 210 introduced in FIG. 2. The non-volatile memory array 504 may receive processed data from the memory interface manager 508 and may return data output.

The storage controller 502 comprises an internal communication bus 512, a storage processor 514, a volatile memory 516 containing a storage controller firmware image 518 (SCFW), an ECC manager 520, a DMA manager 522, and a FLASH translation manager 524 (FTM) and host memory buffer manager 526 (HMBM).

"Internal communication bus" refers to a communication bus that connects or couples to a device or component at points within a device, housing or compartment that includes the device or component. In certain embodiments, an internal communication bus comprises a local interconnect, including a point to point interconnect, between two or more electronic components and may be implemented within a printed circuit board.

Examples of an internal communication bus and/or associated protocols include, but are not limited to an Advanced eXtensible Interface (AXI), an ARM Advanced Microcontroller Bus Architecture (AMBA), a System Management Bus (SMBus, SMB), Inter-integrated Circuit (I2C), GENz, I3C, Peripheral Component Interconnect Express (PCIe) bus, and the like.

In one embodiment, the internal communication bus may comprise a single bus or a combination of two or more busses. For example, in one embodiment, the internal communication bus may comprise a central bus (e.g., an Advanced Microcontroller Bus Architecture ("AMBA") High-performance Bus ("AHB") multi-layer matrix bus for the data path and an advanced peripheral bus ("APB") for the command path.

The storage processor 514 may operate effectively as the processor 302 introduced in FIG. 3. The storage processor 514 may be coupled to the internal communication bus 512, and in this manner may communicate with the volatile memory 516, the host interface manager 506, the memory interface manager 508, the DMA manager 522, and the ECC manager 520. In one embodiment, the internal communication bus 512 may be configured such that the storage processor 514 cannot communicate with the security chip 600. The storage processor 514 may be configured to retrieve and execute the storage controller firmware image 518 saved on the volatile memory 516, also coupled to the internal communication bus 512.

The storage processor 514 may receive control signals regarding workload to from the other components coupled to the internal communication bus 512. These workload attributes may include a percentage of read storage commands received, a percentage of write storage commands received, a queue depth, a percentage of storage commands directed at non-contiguous or random addresses, an average transfer length for data associated with a storage command, an initiator count, a port count, measure of input/outputs per second (TOPS), and the like.

The storage controller firmware image 518 serves as logic for managing and operating the storage controller 502. "Storage controller firmware image" refers to a firmware image configured to manage, control and operate a storage component or device. "Firmware image" refers to a set of firmware organized into a set of organized data, such as a file. Firmware image typically refers to firmware configured for use and operation within a computing device and stored on a storage media. In certain embodiments, the firmware image conforms to a predefined firmware image layout that is defined by a manufacturer, a consortium of manufacturers, an industry standard, or the like.

The storage controller firmware image 518 may be defined by a manufacturer of the storage controller 502 and/or memory device 404/storage device 200. The storage controller firmware image 518 may be periodically replaced or augmented to provided added features or improvements. The storage controller firmware image 518 could be changed by malefactor to include a software virus or malware. This security risk exists for the initial version as well as versions provided during an update or during normal operation of a storage controller firmware image 518. Modern efforts to install malware or a software virus within the storage controller firmware image 518 may include features that avoid detection that the storage controller firmware image 518 has been compromised, the storage controller firmware image 518 becomes compromised firmware.

Embodiments of the disclosed solution avoid being compromised when the storage controller firmware image 518 is compromised because the security chip 600 is independent and separate from, and not integrated with, or in direct communication with the storage processor 514 or volatile memory 516. In one embodiment, the storage processor 514 may be unaware that the security chip 600 is coupled to the internal communication bus 512.

The security chip 600 may comprise a separate component that is installed in the storage controller 502 and/or memory device 404 and couples to the internal communication bus 512. "Security chip" refers to a dedicated hardware component configured to include a processor and non-volatile memory configured, programmed, designed, arranged, or engineered to provide a specific security feature or function. In one embodiment, the security chip is manufactured in a trusted environment and configured to only interact with other electronic components under high security protocols and with limited, or no, access to internal components of the security chip, including any firmware that may be programmed onto the security chip in a trusted environment.

The ECC manager 520 may be configured to encode and decode data stored on and retrieved from the non-volatile memory array 504. "ECC manager" refers to any hardware, software, firmware, circuitry, component, module, logic, device, or apparatus configured, programmed, designed, arranged, or engineered to encode the data received from a host, and decodes and error corrects data read from non-volatile memory. An ECC manager may use one or types of error detection and/or error correction techniques including, but not limited to, adding and checking parity data such as a Cyclic Redundancy Check (CRC), BCH parity data, LDPC codes, and the like.

The DMA manager 522 may also be coupled to the internal communication bus 512 to implement the data path.

The DMA manager 522 may be coupled to the host interface manager 506 and configured to transfer data between the host 510 and the storage controller 502. "DMA manager" refers to any hardware, software, firmware, circuitry, component, module, logic, device, or apparatus configured, programmed, designed, arranged, or engineered to manage transfer of data between a memory location on a host and a memory location, including a memory buffer on a client such as a peripheral device. In one embodiment, the memory location of the host is a host memory buffer.

The FLASH translation manager 524 may be coupled to the internal communication bus 512, either independently or as part of the volatile memory 516 as shown. "Flash translation manager" refers to logic in a non-volatile storage device that includes logical-to-physical address translation providing abstraction of the logical block addresses used by the storage client and the physical block addresses at which the storage controller stores data. The logical-to-physical translation layer maps logical block addresses (LBAs) to physical addresses of data stored on solid-state storage media.

In certain embodiments, the mapping is managed using an address mapping table. This mapping allows data to be referenced in a logical block address space using logical identifiers, such as a block address. A logical identifier does not indicate the physical location of data on the solid-state storage media but is an abstract reference to the data. "Address mapping table" refers to a data structure that associates logical block addresses with physical addresses of data stored on a non-volatile memory array. Alternatively, or in addition, the address mapping table may be referred to as a logical-to-physical address map.

The table may be implemented as an index, a map, a b-tree, a content addressable memory (CAM), a binary tree, a hash table, and the like. The address mapping table may be referred to interchangeably as a Group Allocation Table (GAT), logical-to-physical address map, or the like.

The FLASH translation manager 524 may manage or act as the FLASH translation layer 120 introduced in FIG. 1. The FLASH translation manager 524 may be configured to translate a logical block address into a physical block address within the non-volatile memory array 504, and to manage the caching of an address mapping table, or portions thereof, such as the address mapping table 310, and address mapping table 326.

The host memory buffer manager 526 may be coupled to the internal communication bus 512, either independently or as part of the volatile memory 516 as shown. "Host memory buffer manager" refers to any hardware, firmware, software, circuitry, component, module, logic, device, or apparatus configured, programmed, designed, arranged, or engineered to manage and operation one or more host memory buffers.

The host memory buffer manager 526 may be configured to manage a host memory buffer within host 510 volatile memory, such as the host memory buffer 304. For example, the host memory buffer manager 526 may implement a host memory buffer initialization operation. The host memory buffer manager 526 may also move data between the host memory buffer and volatile memory 516 or the non-volatile memory array 504 (e.g., address mapping table swapping). The host memory buffer manager 526 may also update or read data from submission queues 408, completion queues 410, data buffers 412, address mapping table 414, and/or other memory 416.

The host interface manager 506 may be coupled to an external communication bus 528 and configured to communicate between the host 510 and the storage controller 502.

In one embodiment, the host interface manager 506 may maintain a secure communication channel 536 between the host 510 and the security chip 600. "External communication bus" refers to a communication bus that connects or couples to a device or component from a point external to that device or component.

"Secure communication channel" refers to a set of one or more protocols, software, hardware, and/or firmware components modules or apparatus configured to work together or alone to communicate commands, responses, and/or data between a sending device and a receiving device in a secure manner. In one embodiment, a secure communication channel comprises a way of transferring data that is resistant to overhearing and tampering. ("Secure channel" on Wikipedia. Nov. 2, 2019. Modified. Accessed Nov. 12, 2019.)

In certain embodiments, a secure communication channel comprises an out of band channel which is a separate physical or logical communication channel between the sender and the receiver. The out of band channel may comprise a separate physical connection and wire with a different interface or a separate logical channel that uses a shared physical communication bus but the communication bus and protocol are configured such that the sender and receiver can communicate in an authenticate and secure manner.

The host interface manager 506 may in some embodiments operate as described for the host interface manager 422. The host interface manager 506 may be configured regarding handling of delays in sending and reporting sent and received data and commands. The host interface manager 506 may send incoming data for the non-volatile memory array 504 processing over the internal communication bus 512 to the memory interface manager 508.

An external communication bus 530 couples the memory interface manager 508 to the non-volatile memory array 504.

The memory interface manager 508 may be coupled to the internal communication bus 512 and to an external communication bus 530 coupled to the non-volatile memory array 504 for reading and writing data to the non-volatile memory array 504. "Memory interface manager" or "Flash interface manager" refers to any hardware, firmware, software, circuitry, component, module, logic, device, or apparatus configured, programmed, designed, arranged, or engineered to support, interface with, and conduct communications between a storage controller and one or more memory die or memory chips.

The memory interface manager 508 may in some embodiments operate as described for the memory interface manager 430. Control signals from the host interface manager 506 may be sent to the memory interface manager 508 via the internal communication bus 512. Data from the host interface manager 506 may be sent via a data path comprising the DMA manager 522 and ECC manager 520. The memory interface manager 508 may interact with control signals on the internal communication bus 512 to determine the non-volatile memory array 504 and/or volatile memory 516 address to which to direct data and commands. An indirection table, such as the address mapping table 310, and address mapping table 326, may store address locations for various components of the non-volatile memory array 504 and volatile memory 516 to be utilized by the memory interface manager 508.

The path from the host interface manager 506 to the DMA manager 522, to the ECC manager 520, and from there to the memory interface manager 508 may be considered a data path. The ECC manager 520 may be coupled to the internal communication bus 512 as part of this data path.

The security chip 600 may be coupled to the internal communication bus 512, and may be configured to monitor signal traffic 532 on the internal communication bus 512 and detect anomalies indicative of a compromised storage controller firmware image 518. "Signal traffic" refers to one or more signals, messages, commands, instructions, or events communicated between a sender and one or more receivers on a communication bus.

In one embodiment, the security chip 600 may not operate until a host 510 sends the security chip 600 a firmware monitoring request. The security chip 600 may receive firmware monitoring requests from the host 510 via external communication bus 528. The security chip 600 may receive firmware monitoring requests from the host 510 over the external communication bus 528 and via a control bus that may be incorporated into the internal communication bus 512. "Firmware monitoring request" refers to a request for a receiving device or logic or component ("receiver") to monitor one or more sets of firmware. In particular, the firmware monitoring request may include configuration information, parameters, and/or preferences for the receiver to implement in performing the firmware monitoring. For example, in one embodiment, a firmware monitoring request may include data needed for the receiver to establish a secure communication channel between the receiver and an entity issuing the firmware monitoring request. The security chip 600 may operate independent of the storage processor 514 and of the firmware executing on the storage processor 514.

In response to a firmware monitoring request, a secure communication channel 536 may be established between the security chip 600 and the host 510. In one embodiment, the host 510 may communicate directly with the security chip 600 to provision the security chip 600. Said another way, the host 510 may provide commands and instructions for the security chip 600 to use in monitoring the storage controller 502 for anomalies. In another embodiment, the host 510 engage the host interface manager 506 to establish a secure communication channel. For example, the host 510 may coordinate with the security chip 600 to use a separate communication channel as the secure communication channel 536. In one embodiment, the host 510 follows the Security Protocol and Data Model (SPDM) over Management Component Transport Protocol (MCTP) architecture/protocol to establish a secure communication channel 536 with the security chip 600.

The secure communication channel 536 may be configured to be inaccessible to the firmware executing on the storage processor 514. The secure communication channel 536 may be implemented as a separate signal line in one embodiment.

It should be noted that while FIG. 5 illustrates a separate physical link/connection, the host 510 and security chip 600 may use the external communication bus 528 and still establish a secure communication channel 536 by using encryption and/or separate channels or device addresses. For example, the secure communication channel 536 may also be implemented as a dedicated bus secure communication channel 538 over the internal communication bus 512 and the external communication bus 528 to the host 510.

The firmware monitoring requests may include designations of which storage operations to observe for anomalies. Certain anomalies may indicate a compromised storage controller firmware image. Firmware monitoring requests may designate certain storage operations as target storage operations. For example, a host memory buffer initialization operation may be designated as a target storage operation while other storage operations may not be so designated. "Target storage operation" refers to any storage operation for which a compromised firmware image impacts a time interval for executing the storage operation. The impact on the time interval from the compromised firmware image may be direct or indirect.

A target storage operation may be designated as such when a security chip is fabricated and the storage security firmware image is installed. Alternatively, or in addition, a target storage operation may be designated by a host by including a listing of target storage operations in a firmware monitoring request, before, during or after establishing a secure communication channel with the security chip, or the like. "Storage security firmware image" refers to a firmware image configured to manage, control and operate a security component or device designed, configured, or calibrated, to provide security for a storage device or component and/or monitor activity of a storage device to guard against a security breach or other security failure. "Compromised firmware" refers to firmware or a firmware image that has been changed, modified, and/or altered without the knowledge or permission of the manufacturer, developer, owner, or licensee of the firmware or firmware image.

"Monitor" refers to any hardware, firmware, software, circuitry, component, module, logic, device, or apparatus configured, programmed, designed, arranged, or engineered to monitor, watch, sense, detect, track, record, and/or observe certain activities or operations. In one embodiment, a monitor may detect certain signals, triggers, commands, or other activity indicative of, or related to storage operations within a storage controller. "Trigger" refers to any suitable event and/or set of circumstances which relate to a particular storage operation and/or technique and which can be used to measure a start event for the storage operation. "Start event" refers to an event designated to indicate a suitable starting point for a time measurement for the execution of a storage operation.

The security chip 600 may be configured to notify the host 510 of compromised firmware based on one or more target storage operations. In one embodiment, the security chip 600 may be a separate component on a printed circuit board comprising the storage processor 514 and the volatile memory 516. The internal communication bus 512 may be configured such that the storage processor 514 cannot communicate with the security chip 600.

In certain embodiments, the security chip 600 may receive firmware monitoring requests from a host (e.g., or in other embodiments a security module). In other words, the host provisioning the security chip 600 may be one of hosts 300 or host 402 or a different kind or type of host. In one embodiment, the host may be one of a security module and a computing device external to the system.

In such embodiments, the host may comprise another module, sub-module, system, or subsystem separate from a host that initiates storage operations with the memory device 404. For example, in one embodiment, the host may comprise a security circuit 534.

"Security module" refers to any hardware, circuit, component, module, logic, device, or apparatus configured, programmed, designed, arranged, or engineered to monitor, manage, maintain, or preserve or protect one or more electronic components from intrusion, malware, viruses, and the like.

A security module may also be responsible for other cryptographic features, functions, and digital keys in relation to operations of a system the security module is decided to protect and service. In one embodiment, the host 510 may couple to a security circuit 534 by way of a secure communication channel 536. One example of a security circuit 534 may be a separate chip or subsystem that serves a variety of security functions for a system, including encryption, decryption, digital key management and the like.

Figure 6:
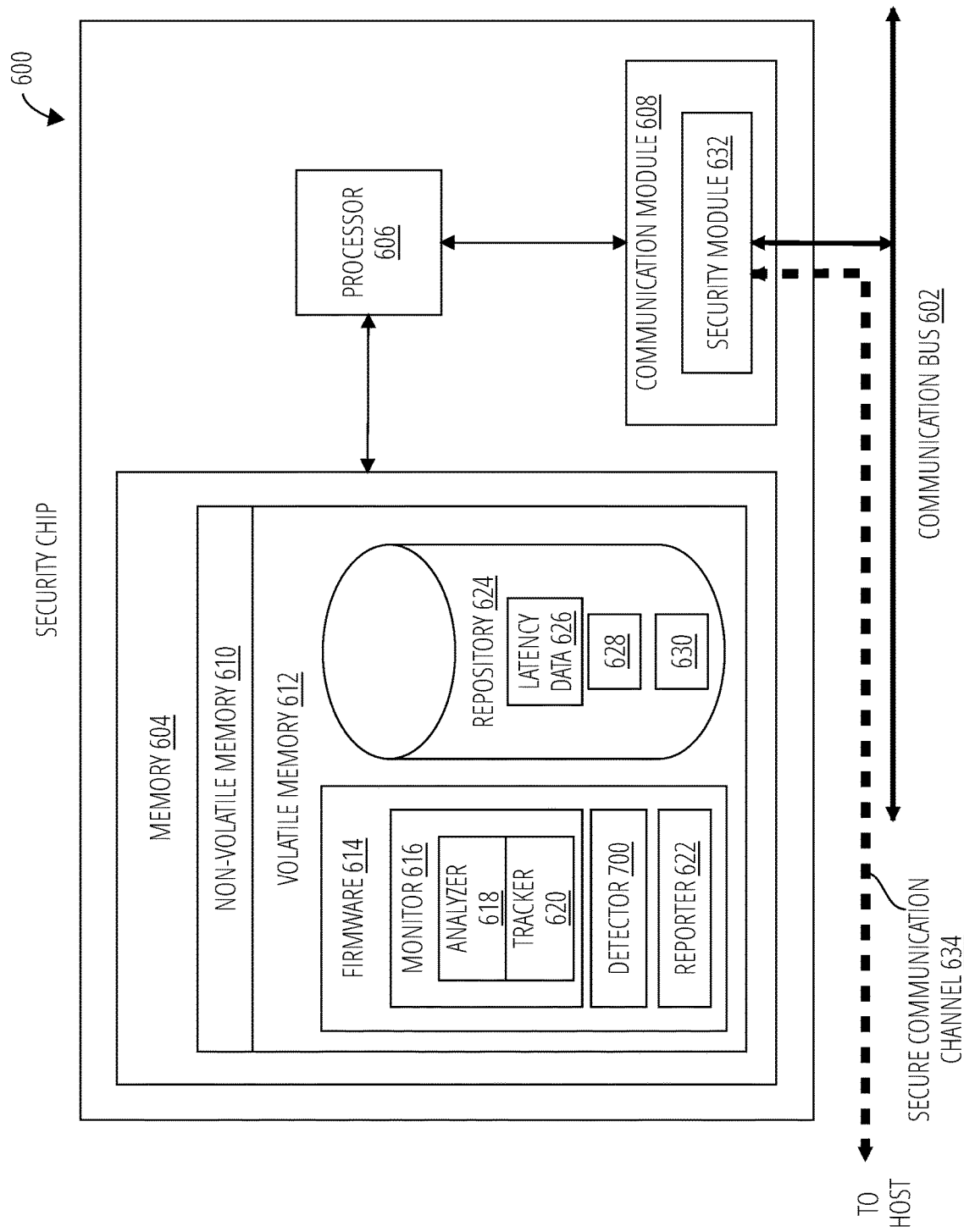
FIG. 6 illustrates a security chip 600 in accordance with one embodiment.

FIG. 6 illustrates a security chip 600 in accordance with one embodiment. The security chip 600 comprises a communication bus 602, a memory 604, a processor 606, and a communication module 608.

The communication bus 602 may be similar to the internal communication bus 512 introduced in FIG. 5. The communication bus 602 may couple to the memory 604 and processor 606 by way of the communication module 608, as shown, or may couple to the various parts directly, or some combination thereof (e.g., using an internal communication bus).

"Communication module" refers to any hardware, software, firmware, circuit, electronic component, module, logic, device, or apparatus configured, programmed, designed, arranged, or engineered to manage, direct, and/or control analog or digital communications between two electronic components. A communication module may use a variety of signal transfer media including wired and wireless interconnects (such as Bluetooth, Radio Frequency (RF), or Wi-fi technology (e.g. radio or chip)). The memory 604 further comprises non-volatile memory 610, and volatile memory 612. The volatile memory 612 contains storage security firmware image 614. The storage security firmware image 614 includes monitor 616 having an analyzer 618 and a tracker 620, a reporter 622, and a detector 700.

The memory 604 may be coupled to the communication bus 602. The memory 604 may store a storage security firmware image 614, an alert threshold 628 and a repository 624 comprising latency data 626.

The processor 606 may be coupled to the communication bus 602. The processor 606 may be configured to execute the storage security firmware image 614. The processor 606 is one example of a storage processor that may be used in various embodiments of the claimed solution.

The communication module 608 may be coupled to the communication bus 602. The communication bus 602 may be configured to communicate anomalies to a host. The communication module 608 may comprise a security module 632. The security module 632 may be configured to establish a secure communication channel 634 between the host and the communication module 608. For example, the security module 632 may communicate with the host to negotiate security keys and encryption protocols for communicating with the host over a secure communication channel 634.

The secure communication channel 634 may similarly behave as described with regard to FIG. 5 for the secure communication channel 536 and dedicated bus secure communication channel 538. In one embodiment, the communication module 608 may be configured to communicate exclusively with the host.

The non-volatile memory 610 also contains a repository 624 of latency data 626, an alert threshold 628, and target storage operations 630. "Repository" refers to any data source or dataset that includes data, or content. In one embodiment, a repository resides on a computing device. In another embodiment, a repository resides on a remote computing or remote storage device. A repository may comprise a file, a folder, a directory, a set of files, a set of folders, a set of directories, a database, an application, a software application, content of a text message, content of an email, content of a calendar entry, and the like. A repository, in one embodiment, comprises unstructured data. A repository, in one embodiment, comprises structured data such as a table, an array, a queue, a look up table, a hash table, a heap, a stack, or the like. A repository may store data in any format including binary, text, encrypted, unencrypted, a proprietary format, or the like.

"Latency data" refers to data that identifies or may be used to determine a latency for an associated activity, event, or operation, such as a storage operation. "Alert threshold" refers to a type of threshold that is predefined such that when a value, rating, or condition satisfies the alert threshold, the system, apparatus, or method is configured to signal either a problem, an error, an anomaly, or a potential for problem, error, or anomalous condition. In certain embodiments, a system, apparatus, or method may respond to satisfaction of an alert threshold by proactively alerting another system, host, controller, processor, circuit, module, or the like. The communication module 608 includes a security module 632.

The storage security firmware image 614 accesses and updates the latency data 626, alert threshold 628, target storage operations 630 as needed based on storage operations being monitored and/or instructions from a host. The storage security firmware image 614 includes a monitor 616, reporter 622, and detector 700. The monitor 616 generates latency data 626 for target storage operations 630 identified based on signal traffic on the communication bus 602.

The monitor 616 may comprise an analyzer 618 configured to detect events in signal traffic traveling over the communication bus 602. "Analyzer" refers to any hardware, software, firmware, circuitry, component, module, logic, device, or apparatus configured, programmed, designed, arranged, or engineered to analyze, examine, and/or review signal traffic or other operations and detect events that are associated with or indicative of a storage operation.

These events detected by the monitor 616 may be characteristic of the target storage operations 630. The monitor 616 may further comprise a tracker 620. The tracker 620 may be configured to measure a time interval between a start event and a stop event. In one embodiment, the start event and stop event are distinctively associated with the target storage operation. In other words, the start event and stop event are of a type and nature that the monitor 616 can clearly identify that the events are associated with the target storage operation. "Tracker" refers to any hardware, firmware, software, circuitry, component, module, logic, device, or apparatus configured, programmed, designed, arranged, or engineered to monitor, watch, track, record, and/or observe a passage of time between two events, such as a start event and a stop event.

"Event" refers to a signal, flag, message, activity, behavior, or characteristic or change in signal, flag, message, activity, behavior, or characteristic that indicates that something has happened. Events may serve as a trigger for other activities or may comprise an activity or behavior that is being observed or is anticipated. Certain events may be watched for in the future. The occurrence of an event may signal or trigger other behaviors.

Examples of an event include, but are not limited to, reading or writing to a particular register or memory address location, raising or lowering a signal on a particular control line, the presence or absence of a particular command, op code, or sequence of commands or opcodes. In certain embodiments, an event may comprise an aggregation or composite of two or more other events.

The monitor 616 communicates with the detector 700. The detector 700 may be configured to determine an anomaly based on the latency data 626 for one or more of the target storage operations 630.

"Detector" refers to any hardware, software, firmware, circuitry, component, module, logic, device, or apparatus configured, programmed, designed, arranged, or engineered to analyze, examine, and/or review signal traffic or other operations and detect events that are associated with, or indicative of, a storage operation.

The detector 700 may communicate with the reporter 622. "Reporter" refers to any hardware, firmware, software, circuitry, component, module, logic, device, or apparatus configured, programmed, designed, arranged, or engineered to report, notify, signal, alert or otherwise communicate a message to another circuit, component, module, device, or system.

If the detector 700 determines that an anomaly exists, the detector 700 may signal the reporter 622. A reporter 622 may then signal a host in response to the detector 700 identifying the anomaly, thus detecting a potentially compromised storage controller firmware image.

A host may designate any one or more of a plurality of different storage operations as target storage operations. The target storage operations 630 may include flash logical block address translation operations, firmware initialization operations, host memory buffer initialization operations, host memory buffer release operations, power down operations, and power on reset operations.

"Firmware initialization operation" refers to an initialization operation that pertains to or is otherwise associated with firmware or a firmware image and steps and/or operations that should be carried out to prepare the firmware for normal operations. "Power on reset operation" refers to an operation that may include a number of steps or operations that a storage controller, electronic components thereof, or other electronic component takes in preparing have a power supply restored. A power on reset operation may be initiated after a system or component is without power for an undefined period of time or after the system or component is without power for a relatively short period of time, intended to reset the system or component.

"Flash logical block address translation operation" refers to an operation that involves the FLASH translation layer. In particular, a flash logical block address translation operation may include an operation to read from, write to, or manage data or metadata relating to operation of a FLASH translation layer.

"Host memory buffer initialization operation" refers to an operation that involves one or more host memory buffers. In particular, a host memory buffer initialization operation may include a number of steps or operations that are completed in preparing a host memory buffer for use and to service the needs of a non-volatile storage device and/or host. Typically, a host memory buffer initialization operation is performed when a host memory buffer is first created, allocated, provisioned, assigned or associated with a non-volatile storage device, or part thereof. Where a host memory buffer comprises one or more dedicated hardware components, a host memory buffer initialization operation may initiate when the hardware components receive a stable power supply.

"Host memory buffer release operation" refers to an operation that involves one or more host memory buffers. In particular, a host memory buffer release operation may include a number of steps or operations that are completed in preparing terminate, close, deallocate, release, or otherwise stop using one or more host memory buffers. Typically, a host memory buffer release operation is performed when a host seeks to recover non-volatile memory that was occupied by the host memory buffer. There may be various reasons for releasing a host memory buffer including dismounting of a non-volatile storage device, a host's request for more non-volatile memory space, a command from a user, a signal initiated by a non-volatile storage device as part of a dismount process, and the like.

"Power down operation" refers to an operation that may include a number of steps or operations that a storage controller, electronic components thereof, or other electronic component takes in preparing have a power supply turned off.

Target storage operations 630 may be initiated by a storage processor, such as the storage processor 514 described in FIG. 5, or any one of the electronic components coupled to a communication bus such as an internal communication bus 512. This storage processor may be coupled to the communication bus, and the communication module may couple to the communication bus in such a way that no communication channel exists, or is available, between the communication module 608 and the storage processor.

Figure 7:
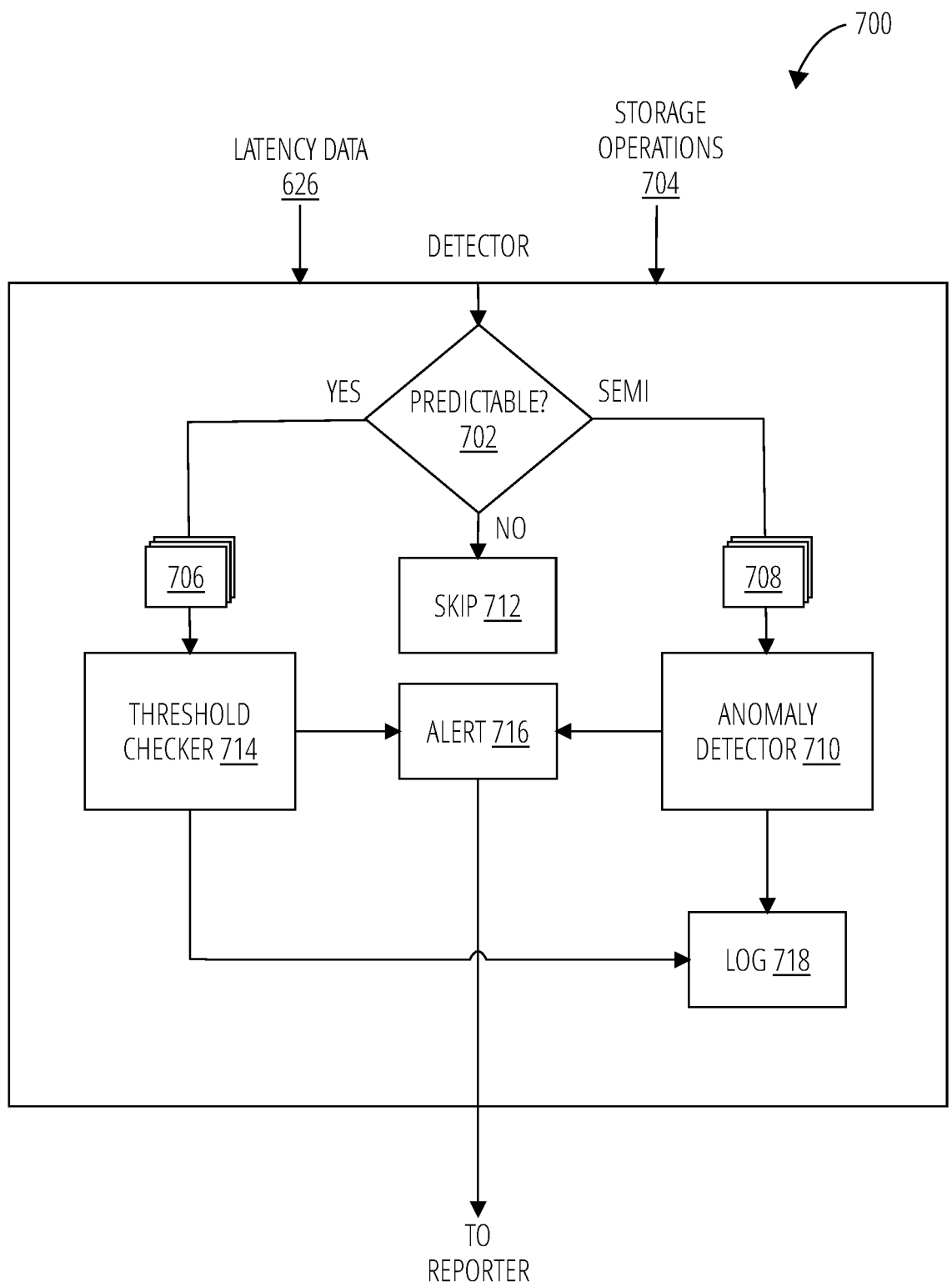
FIG. 7 illustrates a detector 700 in accordance with one embodiment.

FIG. 7 illustrates a detector 700 in accordance with one embodiment. The detector 700 may receive information about latency data 626 and storage operations 704 from other logical modules introduced in FIG. 6, for example modules within storage security firmware image 614.

The storage operations 704 are storage operations that the monitor 616 has detected and measured events for. The storage operations 704 that the detector 700 reviews may include predictable storage operations 706, semi-predictable storage operations 708, and unpredictable storage operations. In certain embodiments, storage operations detected by the monitor 616 may be either predictable storage operations, semi-predictable storage operations, or unpredictable storage operations. In one aspect, the anomaly detector 710 may be configured to distinguish unpredictable storage operations from semi-predictable storage operations. If a storage operation is neither predictable storage operations 706 nor semi-predictable storage operations 708, in one embodiment, the detector 700 may ignore and skip 712 the storage operation. In another embodiment, as an anomaly detector 710 gathers more latency data 626, the anomaly detector 710 may mark certain unpredictable storage operations as semi-predictable storage operations rather than unpredictable storage operations.

"Predictable storage operation" refers to a storage operation that reliably completes within a predefined time interval within an acceptable tolerance level for either boundary of the time interval. "Unpredictable storage operation" refers to a storage operation that completes within an undefined and unpredictable and not a semi-predictable time interval. Examples of an unpredictable storage operation may include certain maintenance storage operations. "Semi-predictable storage operation" refers to a storage operation that completes within a variable time interval within an acceptable tolerance level for either boundary of the time interval. A semi-predictable storage operation is a storage operation having a duration, or completing, within a time interval that is partially predictable. The semi-predictable storage operation has a degree of variance with each iteration.

The detector 700 may first perform a predictable storage operation check 702 to determine whether or not the storage operations 704 received are predictable storage operations 706. Predictable storage operations 706 may be reviewed by a threshold checker 714. The latency data 626 pertaining to these storage operations 704 may be determined to comprise an anomaly if the latency satisfies an alert threshold for the predictable storage operation.

For example, in one embodiment, an example of a predictable storage operation may be a flash logical block address translation operation. In particular, the flash logical block address translation operation may be an operation to determine a physical block address using a logical block address. This type of operation by a FLASH translation layer may be so common and well understood that a time interval may be defined for the operation and configured as an alert threshold. For example, a translation from logical block address (LBA) to physical block address (PBA) may take a few microseconds (e.g., 3-5). Thus, the alert threshold for such an operation may be set at 10 microseconds which means that LBA to PBA translations that take more than 10 microseconds may be considered suspicious by the threshold checker 714 and may cause the detector 700 to register an alert 716. In this manner, the threshold checker 714 checks for anomalies in the behavior of the FLASH translation layer.

Those of skill in the art will recognize that alert thresholds may be set based on a particular kind of predictable storage operation, on a class of predictable storage operations, and/or a variety of predictable storage operations. For example, the flash logical block address translation operation may be defined to include an allowance for time to swap parts of an address mapping table from a mapping table cache or other near processor volatile memory to slower, larger capacity volatile memory or non-volatile memory in order to cache a part of the address mapping table corresponding to a desired LBA.

Other examples of predictable storage operations may include, but are not limited to, a power down operation, a power on reset operation, time for loading storage controller firmware image, a firmware initialization operation, an initialization operation, host memory buffer initialization operation, and the like.

Semi-predictable storage operations are those storage operations that may experience latency variations due to factors outside the completion of steps for the storage operation. One example of a semi-predictable storage operation may comprise a write storage operation, in which the storage controller firmware image writes a page (logical or physical) to the memory array. A write storage operation time latency may be affected by the ambient temperature, the age of a storage block into which the data is being written, and/or a variety of other factors. These influences may make it unreliable to set an alert threshold for the write storage operation that the detector 700 could apply in each instance. Thus, instead of such semi-predictable storage operations being reviewed by the threshold checker 714 they are reviewed by the anomaly detector 710.

The anomaly detector 710 includes logic that accounts for variations and variance that may result in different latency measures for different instances of a storage operation. Advantageously, the anomaly detector 710 has access to data in the log 718 and latency data 626 in the repository 624 in order to perform an analysis of a semi-predictable storage operation.

"Anomaly detector" refers to a device, component, circuit, system, logic, chip, or circuitry configured to identify, mark, signal, log, or annotate an anomaly based on one or more of, a given set of input, historical data, and the like. The semi-predictable storage operations 708 may be deemed to comprise an anomaly in response to one or more of latency data 626 and/or historical data satisfying one or more logic operations of the anomaly detector 710. In order to detect anomalies, the anomaly detector 710 may comprise logic that implements a Support-Vector-Machine (SVM) linear variant method, such as a one-class SVM, a Gaussian-Mixture-Model (GMM) method, a density-based variant detection method, a replicator neural network, a cluster-based variant detection method, and/or a K-means detection method. The anomaly detector 710 may analyze a set of latency data over a historical time period.

"Historical time period" refers to a period of time in the past. A historical time period may comprise any time interval including nanoseconds, microseconds, milliseconds, seconds, minutes, hours, days, weeks, months, and years. Additionally, a historical time period may be defined by an initial event and a subsequent event or a time period since the initial event. For example, a historical time period may be defined starting from when a product is first placed into service, or initiates a die sort testing sequence, or accepts a first request and end after a particular time interval that may include a present time. Furthermore, the historical time period may end when a certain event occurs such as an error condition or completion of a storage operation.

A manufacturer of the security chip may configure or tune the logic of the anomaly detector 710 during fabrication, after the security chip operates in the field, or in response to signals from a host that provisions the security chip. In addition, as the anomaly detector 710 reviews latency data 626 for storage operations over a historical time period, the anomaly detector 710 may tune its logic (e.g., adjust weighting values in a neural network) to more accurately analyze latency data and identify anomalies with greater accuracy. Such tuning may enable the anomaly detector 710 to determine that a storage operations 704 received by the detector 700 is a semi-predictable storage operation. Furthermore, the anomaly detector 710 may determine that the target storage operation exhibits an anomaly that indicates the operation is being performed by compromised firmware.

If the threshold checker 714 and/or anomaly detector 710 determine that an anomaly is present or an alert threshold is met, an alert 716 may be sent to the host. The anomaly detected, along with the associated latency data 626, may also be stored in a log 718 for future use, for example by the anomaly detector 710.

Figure 8:
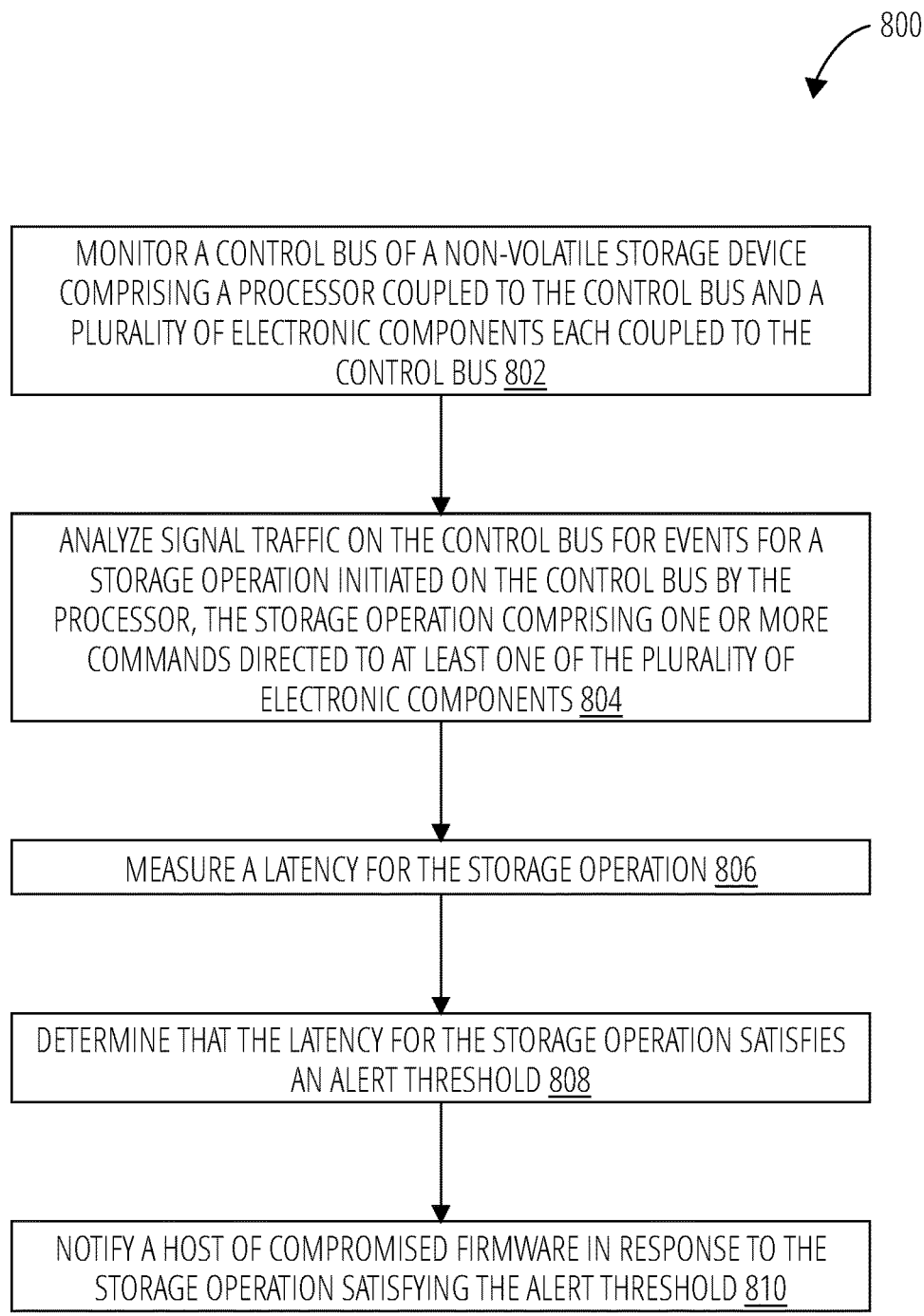
FIG. 8 illustrates a method for detecting a compromised storage controller firmware image 800 in accordance with one embodiment.

FIG. 8 illustrates a method for detecting a compromised storage controller firmware image 800 in accordance with one embodiment. At block 802 a security chip monitors a control bus of a non-volatile storage device. The non-volatile storage device comprises a processor coupled to the control bus and a plurality of electronic components each coupled to the control bus.

The security chip analyzes signal traffic on the control bus at block 804. The security chip looks for events for a storage operation initiated on the control bus by the processor. The storage operation comprises one or more commands directed to at least one of the plurality of electronic components.

At block 806, the security chip measures a latency for the storage operation. At block 808, the security chip determines that the latency for the storage operation satisfies an alert threshold. At block 810, the security chip notifies a host of compromised firmware in response to the storage operation satisfying the alert threshold in block 808.

In one embodiment, detecting the storage operation includes monitoring signal traffic between the processor and one or more of the plurality of electronic components, determining that the signal traffic is associated with a target storage operation, identifying a start event for the target storage operation, and identifying a stop event for the target storage operation. "Stop event" refers to an event designated to indicate a suitable stopping point for a time measurement for the execution of a storage operation.

In one embodiment, measuring the latency further includes measuring a time interval between the start event and the stop event and designating the time interval as the latency for the target storage operation The latency for the target storage operation may be stored by the security chip.

Figure 9:
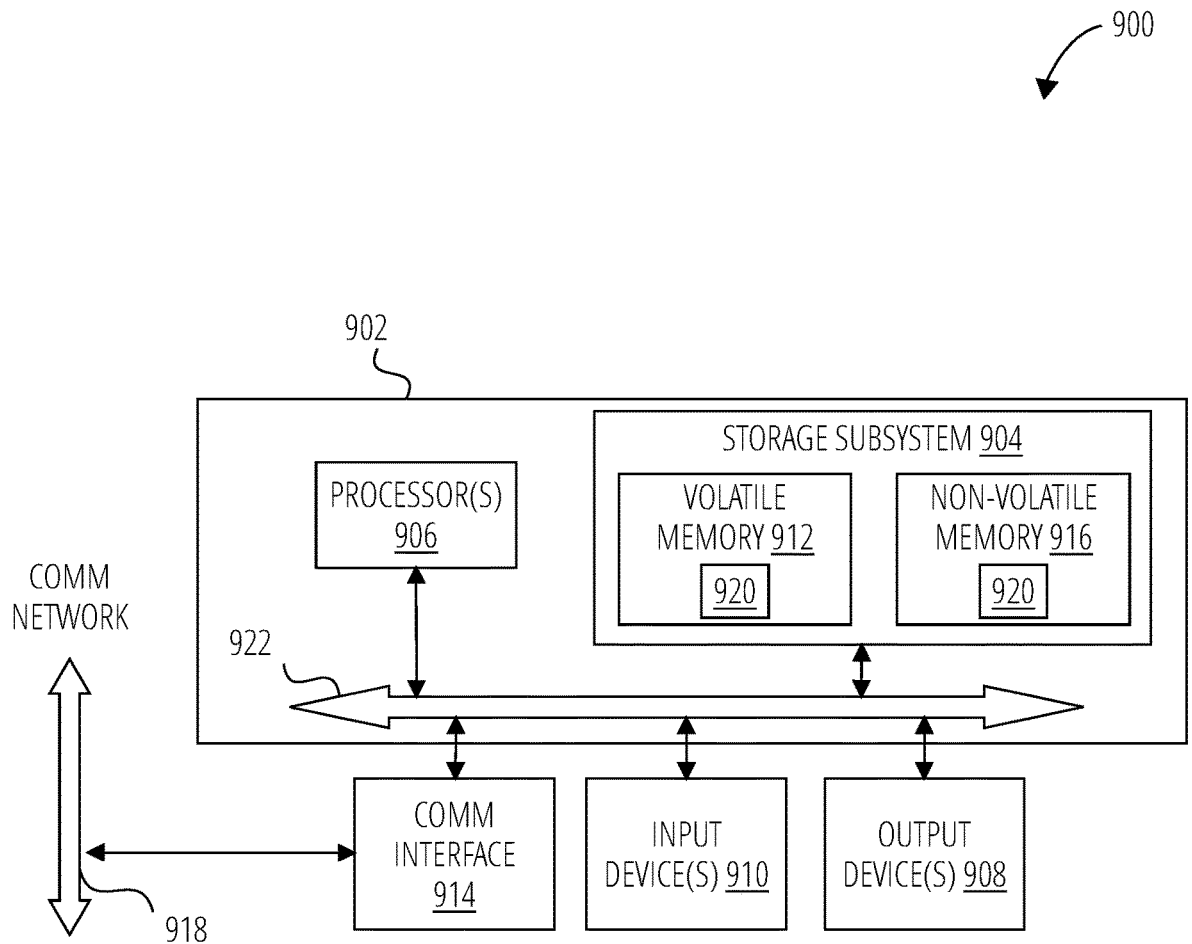
FIG. 9 is an example block diagram of a computing device 900 that may incorporate certain embodiments.

FIG. 9 is an example block diagram of a computing device 900 that may incorporate embodiments of the solution. FIG. 9 is merely illustrative of a machine system to carry out aspects of the technical processes described herein and does not limit the scope of the claims. One of ordinary skill in the art would recognize other variations, modifications, and alternatives. In certain embodiments, the computing device 900 includes a data processing system 902, a communication network 918, communication network interface 914, input device(s) 910, output device(s) 908, and the like.

As depicted in FIG. 9, the data processing system 902 may include one or more processor(s) 906 and a storage subsystem 904. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor, and the like.

The processor(s) 906 communicate with a number of peripheral devices via a bus subsystem 922. These peripheral devices may include input device(s) 910, output device(s) 908, communication network interface 914, and the storage subsystem 904. The storage subsystem 904, in one embodiment, comprises one or more storage devices and/or one or more memory devices.

In one embodiment, the storage subsystem 904 includes a volatile memory 912 and a non-volatile memory 916. The volatile memory 912 and/or the non-volatile memory 916 may store computer-executable instructions that alone or together form logic 920 that when applied to, and executed by, the processor(s) 906 implement embodiments of the processes disclosed herein.

The input device(s) 910 include devices and mechanisms for inputting information to the data processing system 902. These may include a keyboard, a keypad, a touch screen incorporated into a graphical user interface, audio input devices such as voice recognition systems, microphones, and other types of input devices. In various embodiments, the input device(s) 910 may be embodied as a computer mouse, a trackball, a track pad, a joystick, wireless remote, drawing tablet, voice command system, eye tracking system, and the like. The input device(s) 910 typically allow a user to select objects, icons, control areas, text and the like that appear on a graphical user interface via a command such as a click of a button or the like.

The output device(s) 908 include devices and mechanisms for outputting information from the data processing system 902. These may include a graphical user interface, speakers, printers, infrared LEDs, and so on, as well understood in the art. In certain embodiments, a graphical user interface is coupled to the bus subsystem 922 directly by way of a wired connection. In other embodiments, the graphical user interface couples to the data processing system 902 by way of the communication network interface 914. For example, the graphical user interface may comprise a command line interface on a separate computing device 900 such as desktop, server, or mobile device.

The communication network interface 914 provides an interface to communication networks (e.g., communication network 918) and devices external to the data processing system 902. The communication network interface 914 may serve as an interface for receiving data from and transmitting data to other systems. Embodiments of the communication network interface 914 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 914 may be coupled to the communication network 918 via an antenna, a cable, or the like. In some embodiments, the communication network interface 914 may be physically integrated on a circuit board of the data processing system 902, or in some cases may be implemented in software or firmware, such as "soft modems", or the like.

The computing device 900 may include logic that enables communications over a network using protocols such as HTTP, TCP/IP, RTP/RTSP, IPX, UDP and the like.

The volatile memory 912 and the non-volatile memory 916 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 912 and the non-volatile memory 916 may be configured to store the basic programming and data constructs that provide the functionality of the disclosed processes and other embodiments thereof that fall within the scope of the present disclosure.

Logic 920 that implements one or more parts of embodiments of the solution may be stored in the volatile memory 912 and/or the non-volatile memory 916. Logic 920 may be read from the volatile memory 912 and/or non-volatile memory 916 and executed by the processor(s) 906. The volatile memory 912 and the non-volatile memory 916 may also provide a repository for storing data used by the logic 920.

The volatile memory 912 and the non-volatile memory 916 may include a number of memories including a main random access memory (RAM) for storage of instructions and data during program execution and a read only memory (ROM) in which read-only non-transitory instructions are stored. The volatile memory 912 and the non-volatile memory 916 may include a file storage subsystem providing persistent (non-volatile) storage for program and data files. The volatile memory 912 and the non-volatile memory 916 may include removable storage systems, such as removable FLASH memory.

The bus subsystem 922 provides a mechanism for enabling the various components and subsystems of data processing system 902 communicate with each other as intended. Although the communication network interface 914 is depicted schematically as a single bus, some embodiments of the bus subsystem 922 may utilize multiple distinct busses.

It will be readily apparent to one of ordinary skill in the art that the computing device 900 may be a device such as a smartphone, a desktop computer, a laptop computer, a rack-mounted computer system, a computer server, or a tablet computer device. As commonly known in the art, the computing device 900 may be implemented as a collection of multiple networked computing devices. Further, the computing device 900 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
   monitoring a control bus of a non-volatile storage device comprising a processor coupled to the control bus and a plurality of electronic components each coupled to the control bus;
   analyzing signal traffic on the control bus for events for a storage operation initiated on the control bus by the processor, the storage operation comprising one or more commands directed to at least one of the plurality of electronic components;
   measuring a latency for the storage operation;
   determining that the latency for the storage operation satisfies an alert threshold, wherein the determining comprises:
      determining that the latency of the storage operation comprises a first anomaly in response to the latency satisfying an alert threshold for the storage operation and the storage operation comprises a predictable storage operation; and/or
      determining that the latency of the storage operation comprises a second anomaly in response to the latency satisfying an anomaly detector for the storage operation and the storage operation comprises a semi-predictable storage operation; and
   notifying a host of a compromised firmware in response to the storage operation satisfying the alert threshold.

2. The method of claim 1, wherein detecting the storage operation comprises:
   monitoring signal traffic between the processor and one or more of the plurality of electronic components;
   determining that the signal traffic is associated with a target storage operation; and
   identifying a start event for the target storage operation; and
   identifying a stop event for the target storage operation.

3. The method of claim 2, wherein measuring the latency further comprises measuring a time interval between the start event and the stop event and designating the time interval as the latency for the target storage operation, the method further comprising storing the latency for the target storage operation.

4. The method of claim 1, further comprising receiving a firmware monitoring request from the host at a security chip coupled to the control bus, the security chip operating independent of the processor and independent of firmware executing on the processor, the security chip configured to notify the host of compromised firmware based on one or more target storage operations.

5. The method of claim 4, wherein the firmware monitoring request designates one or more storage operations as target storage operations.

6. The method of claim 1, wherein the anomaly detector comprises logic that implements one of:
   a Support-Vector-Machine (SVM) linear variant method;
   a Gaussian-Mixture-Model (GMM) method;
   a density-based variant detection method; a replicator neural network;
   a cluster-based variant detection method; and a K-means detection method.

7. A method, comprising:
monitoring a control bus of a non-volatile storage device comprising a processor coupled to the control bus and a plurality of electronic components each coupled to the control bus;
analyzing signal traffic on the control bus for events for a storage operation initiated on the control bus by the processor, the storage operation comprising one or more commands directed to at least one of the plurality of electronic components;
measuring a latency for the storage operation;
determining that the latency for the storage operation satisfies an alert threshold;
notifying a host of a compromised firmware in response to the storage operation satisfying the alert threshold; and
receiving a firmware monitoring request from the host at a security chip coupled to the control bus, the security chip operating independent of the processor and independent of firmware executing on the processor, the security chip configured to notify the host of compromised firmware based on one or more target storage operations, wherein in response to receiving the firmware monitoring request, establishing a secure communication channel between the security chip and the host, the secure communication channel configured to be inaccessible to the firmware executing on the processor.

8. An apparatus, comprising:
a communication bus;
a memory coupled to the communication bus, the memory configured to store a storage security firmware image, an alert threshold, and a repository comprising latency data;
a processor coupled to the communication bus, the processor configured to execute the storage security firmware image comprising:
  a monitor configured to generate latency data for a target storage operation, the target storage operation identified based on signal traffic on the communication bus;
  a detector configured to:
    determine an anomaly based on the latency data for the target storage operation, wherein the determining comprises:
      determining that a latency of the storage operation comprises a first anomaly in response to the latency satisfying an alert threshold for the storage operation and the storage operation comprises a predictable storage operation; and/or
      determining that the latency of the storage operation comprises a second anomaly in response to the latency satisfying an anomaly detector for the storage operation and the storage operation comprises a semi-predictable storage operation; and
    a reporter configured to signal a host in response to the detector identifying the anomaly indicating a compromised storage controller firmware image; and
  a communication module coupled to the communication bus and configured to communicate the anomaly to the host.

9. The apparatus of claim 8, wherein the monitor comprises:
an analyzer configured to detect events in signal traffic traveling over the communication bus based on a trigger, the events characteristic of the target storage operation;
a tracker configured to measure a time interval between a start event and a stop event, the start event and stop event distinctively associated with the target storage operation.

10. The apparatus of claim 8, wherein the communication module comprises a security module configured to establish a secure communication channel between the host and the communication module.

11. The apparatus of claim 8, wherein the target storage operation comprises one of a flash logical block address translation operation, a firmware initialization operation, a host memory buffer initialization operation, a host memory buffer release operation, a power down operation, and a power on reset operation.

12. The apparatus of claim 8, wherein the anomaly is indicative of the compromised storage controller firmware image.

13. The apparatus of claim 8, wherein the detector comprises an anomaly detector configured to:
analyze a set of latency data over a historical time period;
tune the anomaly detector based on the analyzed set of latency data;
determine that the target storage operation comprises a semi-predictable storage operation;
determine that the latency data for the target storage operation indicates the anomaly; and
log the anomaly and the latency data.

14. The apparatus of claim 8, wherein the communication module is configured to communicate exclusively with the host.

15. The apparatus of claim 8, wherein the target storage operation is initiated by a storage processor coupled to the communication bus and the communication module couples to the communication bus such that no communication channel exists between the communication module and the storage processor.

* * * * *